United States Patent
Jang et al.

(10) Patent No.: US 9,219,593 B2
(45) Date of Patent: Dec. 22, 2015

(54) DEVICE-TO-DEVICE DATA TRANSMISSION METHOD IN WIRELESS ACCESS SYSTEM SUPPORTING DEVICE-TO-DEVICE COMMUNICATION, AND APPARATUS THEREFOR

(75) Inventors: Jiwoong Jang, Anyang-si (KR); Hyunsoo Ko, Anyang-si (KR); Hangyu Cho, Anyang-si (KR)

(73) Assignee: LG Electronics Inc., Seoul (KR)

(*) Notice: Subject to any disclaimer, the term of this patent is extended or adjusted under 35 U.S.C. 154(b) by 8 days.

(21) Appl. No.: 14/237,237

(22) PCT Filed: Aug. 22, 2012

(86) PCT No.: PCT/KR2012/006668
§ 371 (c)(1),
(2), (4) Date: Feb. 5, 2014

(87) PCT Pub. No.: WO2013/028005
PCT Pub. Date: Feb. 28, 2013

(65) Prior Publication Data
US 2014/0177585 A1    Jun. 26, 2014

Related U.S. Application Data

(60) Provisional application No. 61/525,854, filed on Aug. 22, 2011, provisional application No. 61/528,286, filed on Aug. 29, 2011.

(51) Int. Cl.
*H04W 4/00* (2009.01)
*H04L 5/00* (2006.01)
*H04W 72/12* (2009.01)
*H04W 72/04* (2009.01)
*H04W 76/04* (2009.01)

(52) U.S. Cl.
CPC ............ *H04L 5/0091* (2013.01); *H04L 5/0044* (2013.01); *H04W 72/04* (2013.01); *H04W 72/12* (2013.01); *H04W 76/043* (2013.01)

(58) Field of Classification Search
None
See application file for complete search history.

(56) References Cited

U.S. PATENT DOCUMENTS

| 2010/0136997 | A1  | 6/2010 | Palanki et al. |
|---|---|---|---|
| 2010/0165882 | A1  | 7/2010 | Palanki et al. |
| 2011/0069653 | A1* | 3/2011 | Wang et al. ................. 370/312 |
| 2012/0120885 | A1* | 5/2012 | Wang et al. ................. 370/329 |

FOREIGN PATENT DOCUMENTS

KR    1020100137357 A    12/2010

OTHER PUBLICATIONS

Institute for Information Industry (III), et al., "Dynamic Separate RACH Resource for MTC", 3GPP TSG RAN WG2 #74, R2-113328, May 9-13, 2011.

* cited by examiner

*Primary Examiner* — Jutai Kao
(74) *Attorney, Agent, or Firm* — Dentons US LLP

(57) ABSTRACT

Disclosed are a device-to-device (D2D) data transmission method in a wireless access system supporting D2D communication and an apparatus therefor. According to one embodiment of the present invention, a D2D data transmission method in a wireless access system which supports D2D communication and cellular communication can comprise: a step in which a first device, which performs D2D communication with a second device, transmits first data to the second device only through a physical channel using an uplink of the cellular communication; and a step in which the first device receives second data from the second device through the physical channel.

14 Claims, 19 Drawing Sheets

FIG. 4
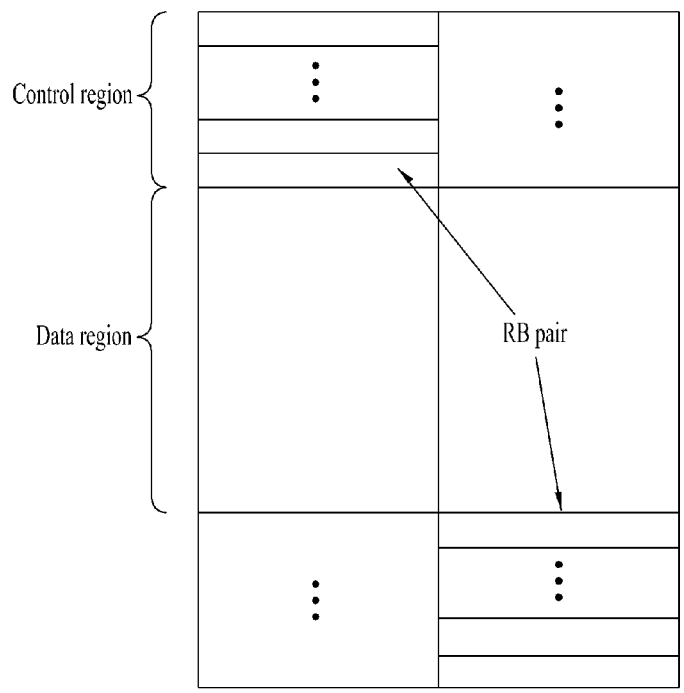
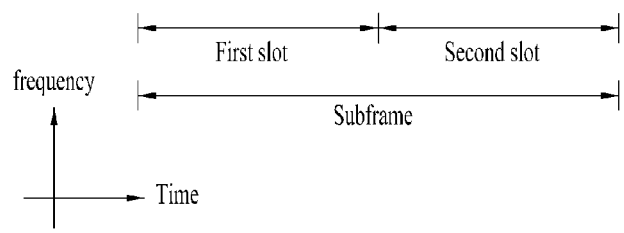
FIG. 5
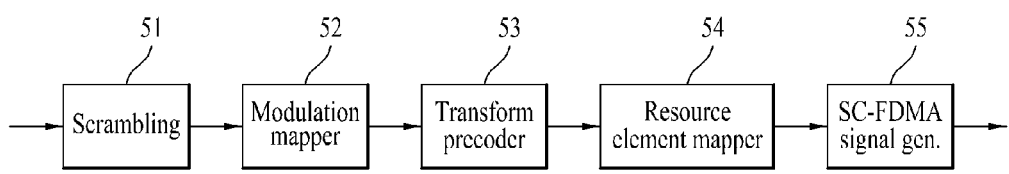

FIG. 6
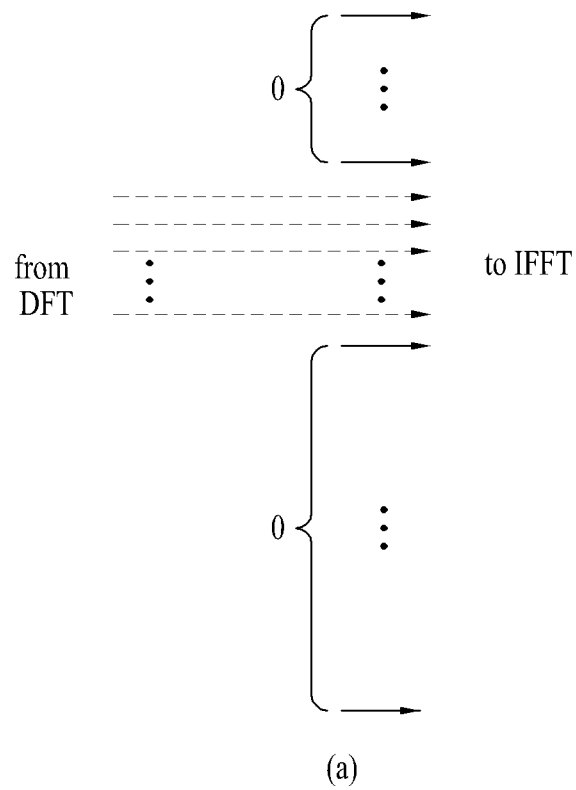
(a)
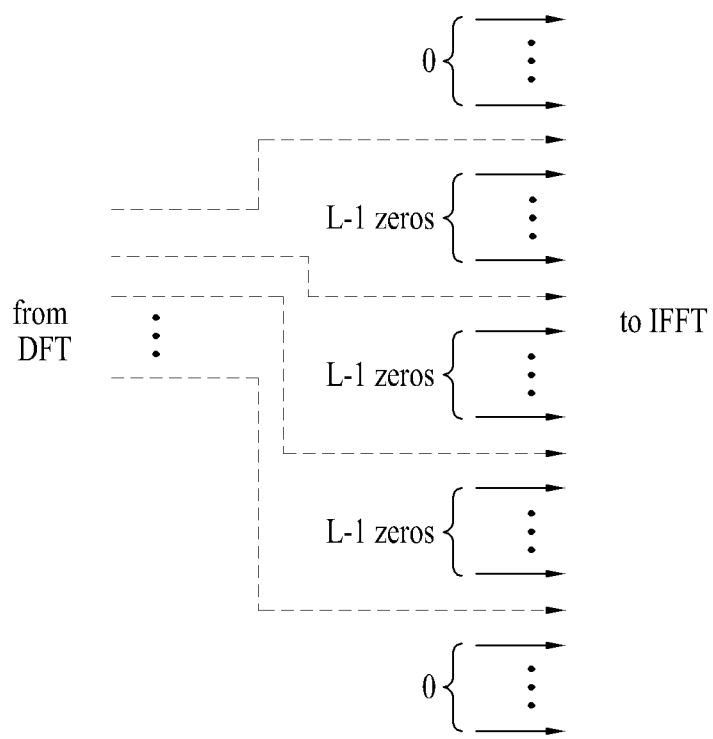
(b)

DEVICE-TO-DEVICE DATA TRANSMISSION METHOD IN WIRELESS ACCESS SYSTEM SUPPORTING DEVICE-TO-DEVICE COMMUNICATION, AND APPARATUS THEREFOR

This application is a 35 USC §371 National Stage entry of International Application No. PCT/KR2012/006668, filed on Aug. 22, 2012, and claims priority of U.S. Provisional Application Nos. 61/525,854 filed Aug. 22, 2011, and 61/528,286 filed Aug. 29, 2011 which are each hereby incorporated by reference in its entirety.

TECHNICAL FIELD

The present invention relates to a wireless access system supporting device-to-device (D2D) communication and, more particularly, to a D2D data transmission method for D2D communication, and a device therefor.

BACKGROUND ART

Device-to-device (D2D) communication in the present invention will now be described in brief.

D2D communication refers to communication between an electronic device and another electronic device. In a broad sense, D2D communication means communication between electronic devices or communication between a human-controlled device and a machine. However, D2D communication currently means wireless communication between an electronic device and another electronic device without human interaction.

In the early 1990s when the concept of D2D communication was introduced, D2D communication was regarded simply as remote control or telematics and the market therefor was very limited. However, D2D communication has rapidly grown over the past few years and has developed into a market attracting worldwide attention. Particularly, D2D communication has a great influence on the fields of point of sales (POS), fleet management, remote monitoring of machines and facilities, etc. As D2D communication will serve many more usages in conjunction with legacy mobile communication and wireless ultrahigh-speed Internet or low-power communication solutions such as wireless fidelity (Wi-Fi) and ZigBee, it will be extended to the business-to-consumer (B2C) market beyond the business-to-business (B2B) market.

In the era of D2D communication, all devices equipped with subscriber identity module (SIM) cards are capable of transmitting and receiving data and thus may be managed and controlled remotely. For example, D2D communication may be used in a very large number of devices and equipment such as cars, trucks, trains, containers, vending machines, gas tanks, etc.

Conventionally, terminals are generally managed on an individual basis and thus a one-to-one communication environment is mostly established between a base station (BS) and terminals. When a large number of D2D devices communicate with a BS in this environment, network overload will be caused due to signaling therebetween.

Besides, research has not been actively conducted on specific D2D data transmission schemes in a wireless access system supporting D2D communication and cellular communication.

DISCLOSURE

Technical Problem

An object of the present invention devised to solve the problem lies in an efficient data transmission method for a device-to-device (D2D) device.

Another object of the present invention devised to solve the problem lies in a method of performing D2D communication using only an uplink (UL) transmission scheme of a cellular network.

Another object of the present invention devised to solve the problem lies in a method of transmitting data by multiplexing a control channel signal to be transmitted on a control channel, with a physical uplink shared channel (PUSCH) in D2D communication.

A further object of the present invention devised to solve the problem lies in a method of performing D2D communication using only a downlink (DL) transmission scheme of a cellular network.

The technical problems to be solved by the present invention are not limited to the above problems and other technical problems which are not described herein will become apparent to those skilled in the art from the following description.

Technical Solution

The object of the present invention can be achieved by providing a device-to-device (D2D) data transmission method in a wireless access system supporting D2D communication and cellular communication, the method including transmitting, by a first device which performs D2D communication with a second device, first data to the second device using only a physical channel used for uplink (UL) transmission in the cellular communication, and receiving, by the first device, second data from the second device using only the physical channel.

The physical channel may be a physical uplink shared channel (PUSCH), and the first device may transmit the first data to the second device by multiplexing a control channel signal to be transmitted on a control channel, with the PUSCH.

The transmitting includes transmitting only control information to the second device using quadrature phase shift keying (QPSK) modulation scheme.

The D2D data transmission method may further include receiving, by the first device, an offset value required to calculate the number of resource elements (REs) allocated to the control channel, from the second device.

The D2D data transmission method may further include calculating, by the first device, an offset value required to calculate the number of REs allocated to the control channel, based on acknowledgement (ACK)/negative-ACK (NACK) information received from the second device.

In another aspect of the present invention, provided herein is a device-to-device (D2D) data transmission method in a wireless access system supporting D2D communication and cellular communication, the method including transmitting, by a first device which performs D2D communication with a second device, first data to the second device using only a physical channel used for downlink (DL) transmission in the cellular communication, and receiving, by the first device, second data from the second device using only the physical channel.

The physical channel may be a physical downlink shared channel (PDSCH), and the first device may transmit control information and the first data to the second device using the PUSCH.

In another aspect of the present invention, provided herein is a device for performing device-to-device (D2D) communication in a wireless access system supporting D2D communication and cellular communication, the device including a radio frequency (RF) unit for transmitting and receiving wireless signals, and a processor for performing D2D communication with a second device, wherein the processor transmits first data to the second device through the RF unit using only a physical channel used for uplink (UL) transmission in the cellular communication, and receives second data from the second device through the RF unit using only the physical channel.

The physical channel may be a physical uplink shared channel (PUSCH), and the processor may transmit the first data to the second device by multiplexing a control channel signal to be transmitted on a control channel, with the PUSCH.

The processor may transmit only control information to the second device through the RF unit using quadrature phase shift keying (QPSK) modulation scheme.

The processor may receive an offset value required to calculate the number of resource elements (REs) allocated to the control channel, from the second device.

The processor may calculate an offset value required to calculate the number of REs allocated to the control channel, based on acknowledgement (ACK)/negative-ACK (NACK) information received from the second device.

In another aspect of the present invention, provided herein is a device for performing device-to-device (D2D) communication in a wireless access system supporting D2D communication and cellular communication, the device including a radio frequency (RF) unit for transmitting and receiving wireless signals, and a processor for performing D2D communication with a second device, wherein the processor transmits first data to the second device through the RF unit using only a physical channel used for downlink (DL) transmission in the cellular communication, and receives second data from the second device through the RF unit using only the physical channel.

The physical channel may be a physical downlink shared channel (PDSCH), and the processor may transmit control information and the first data to the second device using the PUSCH.

It is to be understood that both the foregoing general description and the following detailed description of the present invention are exemplary and explanatory and are intended to provide further explanation of the invention as claimed.

Advantageous Effects

The embodiments of the present invention have the following effects.

First, a device-to-device (D2D) device may perform D2D communication using only an uplink (UL) transmission scheme of a cellular network. Accordingly, size and costs thereof may be reduced in comparison to the case that the D2D device uses two schemes (UL and downlink (DL) transmission schemes).

Second, a D2D device may transmit data by multiplexing a control channel signal to be transmitted on a control channel signal, with a physical uplink shared channel (PUSCH) in D2D communication. In this case, interference in an uplink control channel of the existing cellular network due to D2D communication may be reduced.

Third, a D2D device may perform D2D communication using only a DL transmission scheme of a cellular network. Accordingly, size and costs thereof may be reduced in comparison to the case that the D2D device uses two schemes (UL and DL transmission schemes).

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 4 is a diagram illustrating the structure of an uplink (UL) subframe;

FIG. 5 is a diagram for describing a signal processing operation of a user equipment (UE) to transmit a UL signal;

FIG. 6 is a diagram for describing a signal mapping scheme in the frequency domain to satisfy single carrier property;

BEST MODE

Figure 1:
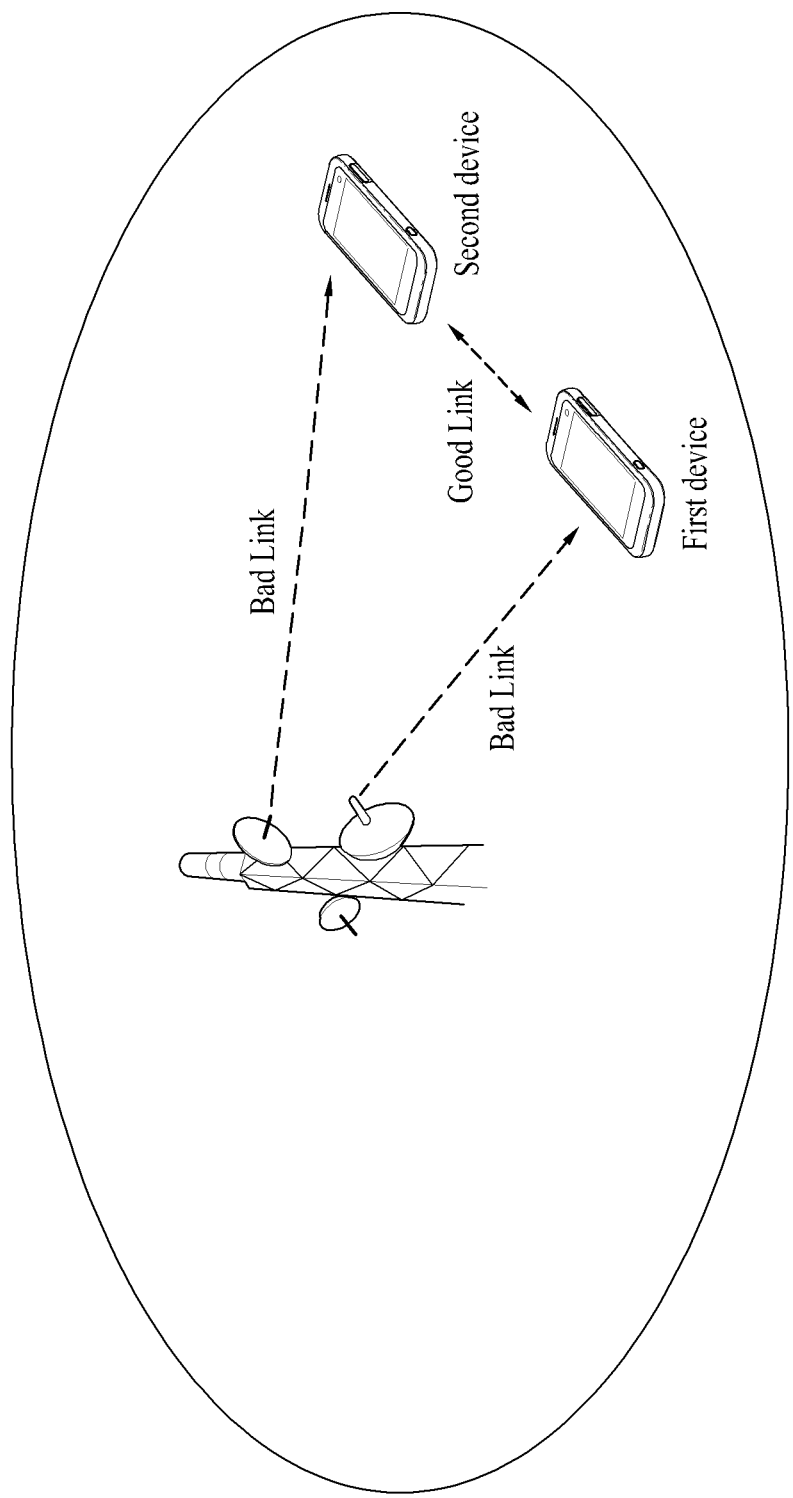
FIG. 1 is a diagram illustrating an example of device-to-device (D2D) communication.

Embodiments of the present invention provide a seamless device-to-device (D2D) communication method, a communication switching method to a cellular network, and devices supporting the methods, in a wireless access system supporting D2D communication.

The embodiments described below are provided by combining components and features of the present invention in specific forms. The components or features of the present invention may be considered optional unless explicitly stated otherwise. The components or features may be implemented without being combined with other components or features. The embodiments of the present invention may also be provided by combining some of the components and/or features. The order of operations described in the embodiments of the present invention may be changed. Some components or features of one embodiment may be included in another embodiment or may be replaced with corresponding components or features of another embodiment.

In the following description made in conjunction with the drawings, procedures or steps that may obscure the subject matter of the present invention as well as procedures or steps that will be apparent to those skilled in the art are not described.

In this specification, the embodiments of the present invention have been described focusing mainly on data communication relationships between a base station (BS) and a mobile station (MS). The BS is a terminal node in a network which performs communication directly with the MS. Specific operations described as being performed by the BS may also be performed by an upper node of the BS as needed.

That is, the BS or any other network node may perform various operations for communication with MSs in a network including a number of network nodes including BSs. The term "base station (BS)" may be replaced with the term such as "fixed station", "Node B", "enhanced Node B (eNode B or eNB)", "advanced base station (ABS)", "access point (AP)", etc.

In the present invention, the term "D2D device" refers to a terminal for performing D2D communication and may be referred to simply as "device". In addition, the term "D2D device" may be replaced with the term such as "mobile station (MS)", "user equipment (UE)", "subscriber station (SS)", "mobile subscriber station (MSS)", "mobile terminal", "terminal", "device", "machine-to-machine (M2M) device", etc.

The term "transmitting end" refers to a fixed and/or mobile node that provides data or audio service and the term "receiving end" refers to a fixed and/or mobile node that receives data or audio service. Accordingly, in uplink, the MS may serve as a transmitting end and the BS may serve as a receiving end. Likewise, in downlink, the MS may serve as a receiving end and the BS may serve as a transmitting end.

The embodiments of the present invention can be supported by standard documents disclosed for at least one of wireless access systems such as Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved-UTRA (E-UTRA), etc. UTRA is a part of universal mobile telecommunication system (UMTS). 3GPP LTE is a part of evolved UMTS (E-UMTS) using E-UTRA. 3GPP LTE employs OFDMA for downlink and SC-FDMA for uplink. LTE-A is an evolution of 3GPP LTE.

Reference will now be made in detail to the preferred embodiments of the present invention with reference to the accompanying drawings.

The detailed description, which will be given below with reference to the accompanying drawings, is intended to explain exemplary embodiments of the present invention, rather than to show the only embodiments that can be implemented according to the invention.

Embodiments of the present invention will now be described in detail with reference to the accompanying drawings so that those skilled in the art can easily practice the present invention. However, the present invention is not limited to the embodiments described below and can be implemented in various other forms. Portions which are not specifically related to the present invention will not be described in order to clearly explain the present invention and like reference numbers will be used throughout the drawings to refer to like parts.

Throughout the specification, when a certain part "includes" a certain element, it means that the part does not exclude another component but may further include another component unless explicitly stated otherwise. Furthermore, the term "unit", " - - - or (or - - - er)", "module", etc. means a unit for executing at least one function or operation, which can be implemented as hardware, software, or a combination of hardware and software.

Specific terms used in the embodiments of the present invention are provided for better understanding of the present invention and can be replaced with other terms without departing from the spirit of the present invention.

1. Outline of D2D Communication

In this specification, D2D communication is a method of directly exchanging data between devices, and may be contrasted with cellular communication in which each device exchanges data with a BS. In this case, each device may transmit and receive data through D2D communication and receive control information for direct communication between devices from a BS. Accordingly, D2D communication is different from Bluetooth communication, infrared communication, etc. performed without a BS.

A first device normally exchanges data and/or control information with a BS through a second device, but may directly exchange data and/or control information with the BS as necessary. That is, the first device may directly exchange data with the BS in consideration of a channel state between the first device and the BS, and a channel state between the first and second devices. In this case, data and/or control information directly exchanged between the first device and the BS may be identical to or different from the data and/or control information exchanged between the first device and the BS through the second device.

The term "device-to-device (D2D) communication" may be used interchangeably with the term "terminal-to-terminal communication (or machine-to-machine (M2M) communication)", "peer-to-pear (P2P) communication", etc. For convenience of explanation, the term "P2P communication" will be representatively used in describing embodiments of the present invention. In addition, in this specification, the term "D2D device (or device)" refers to a UE supporting D2D communication.

Meanwhile, in the present invention, all nodes other than the D2D device are collectively called BSs. For example, a relay node, an antenna node of a distributed antenna system (DAS), etc. are collectively called BSs in a sense of access points to access a BS.

FIG. 1 is a diagram illustrating an example of D2D communication. Specifically, FIG. 1 illustrates D2D communication between two D2D devices (first and second devices) located close to each other at a cell edge.

The primary goal of D2D communication is to save power/resources compared to communication through a BS, by connecting a direct link between devices having a good direct channel connection condition (for example, devices close to each other). In particular, as illustrated in FIG. 1, D2D communication is efficient between devices (first and second devices) located close to each other at a cell edge. In this case, when the first and second devices exchange data through a BS, since channel states with the BS are not good, consumption of resources/power is increased.

2. Outline of 3GPP LTE/LTE-A System in Cellular Communication

In cellular communication, a UE receives information from a BS in downlink and transmits information to the BS in uplink. The information transmitted and received by the BS and the UE includes packet data information and various types of control information, and there are a variety of physical channels according to the type/use of the transmitted and received information.

Figure 2:
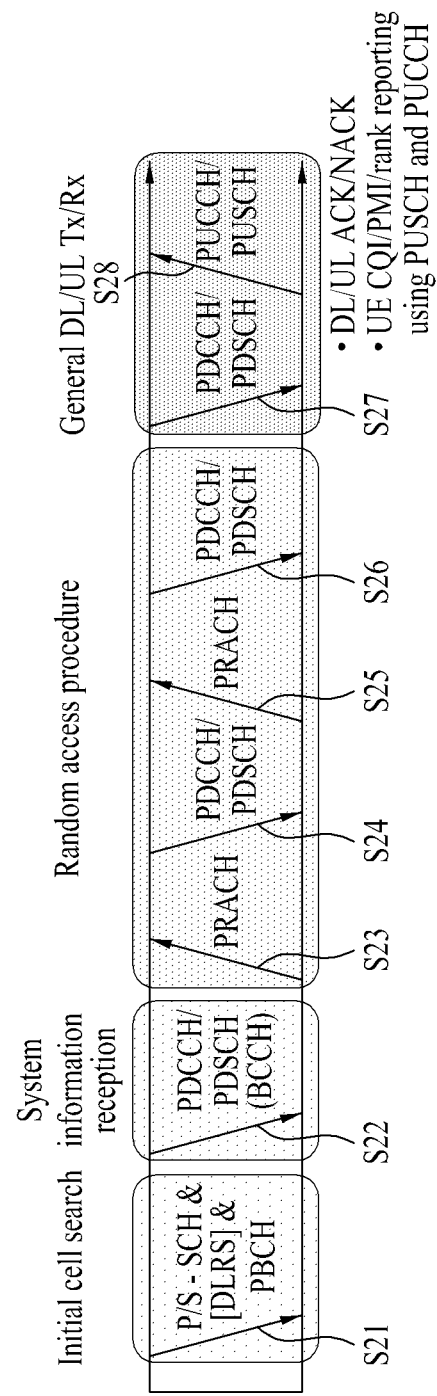
FIG. 2 is a diagram for describing physical channels used in a 3rd Generation Partnership Project long term evolution (3GPP LTE) system and a general signal transmission method using the physical channels.

FIG. 2 is a diagram for describing physical channels used in a 3GPP LTE system and a general signal transmission method using the physical channels.

A UE which is powered on from a power-off state or which newly enters a cell performs initial cell search, for example, synchronization with a BS, in step S21. In this regard, the UE receives primary synchronization channel (P-SCH) information and secondary synchronization channel (S-SCH) information from the BS to achieve synchronization with the BS, and obtains information such as a cell identifier (ID).

After that, the UE receives a physical broadcast channel (PBCH) signal from the BS to obtain broadcast information in a cell. The UE receives a downlink reference signal (DL RS) in the initial cell search to check a downlink channel state.

After the initial cell search, the UE receives a physical downlink control channel (PDCCH) and a physical downlink shared channel (PDSCH) based on PDCCH information to obtain detailed system information, in step S22.

After that, the UE may perform a random access procedure including subsequent steps S23 to S26 to complete access to the BS. In this regard, the UE may transmit a preamble on a physical random access channel (PRACH) (S23) and receive a response message to the preamble on a PDCCH and a PDSCH corresponding to the PDCCH (S24). In the case of contention based random access, the UE may transmit an additional PRACH signal (S25) and receive a PDCCH signal and a PDSCH signal corresponding to the PDCCH signal (S26), as a contention resolution procedure.

After the above-described procedure, the UE may receive a PDCCH signal and/or a PDSCH signal (S27) and transmit physical uplink shared channel (PUSCH) signal and/or a physical uplink control channel (PUCCH) signal (S28), as a general uplink (UL)/downlink (DL) signal transmission procedure.

Control information transmitted from the UE to the BS is referred to as uplink control information (UCI). The UCI includes hybrid automatic repeat and request acknowledgement/negative-ACK (HARQ-ACK/NACK), scheduling request (SR), channel quality indication (CQI), precoding matrix indication (PMI), rank indication (RI), etc.

In general, the UCI is periodically transmitted on a PUCCH in an LTE system. However, it may be transmitted on a PUSCH when control information and packet data should be simultaneously transmitted. In addition, the UCI may be aperiodically transmitted on a PUSCH upon a request/instruction of a network.

Figure 3:
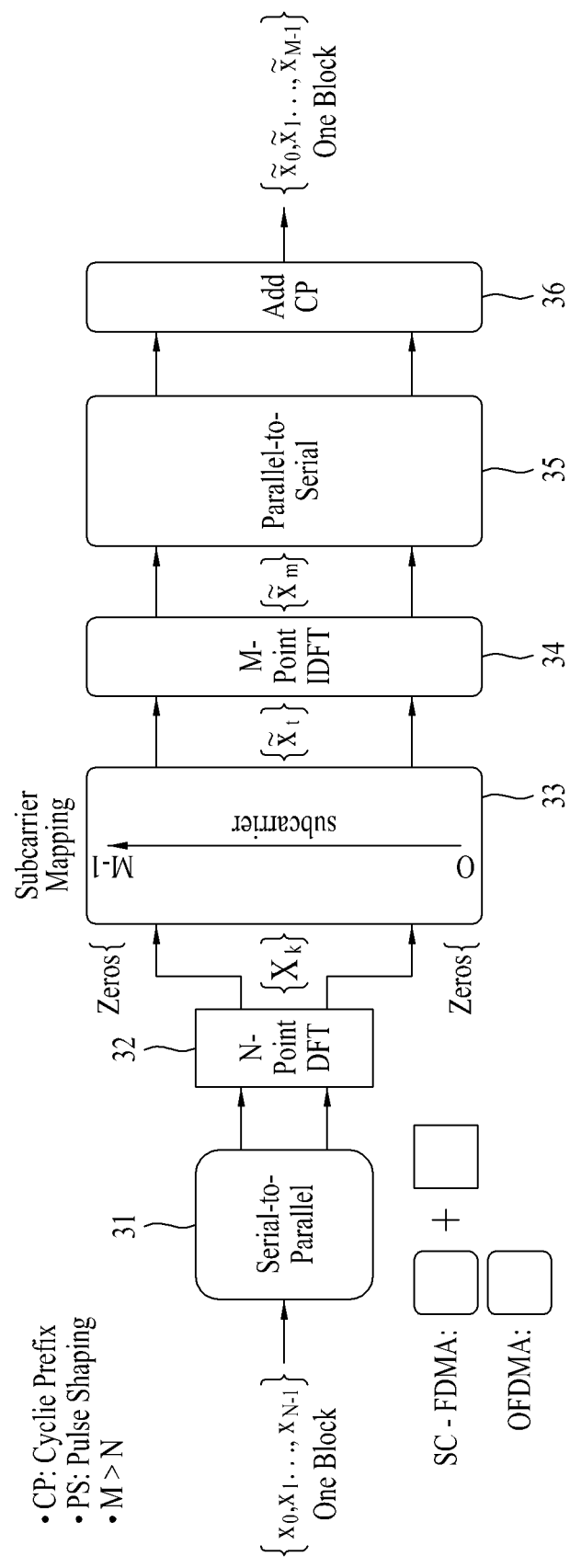
FIG. 3 is a diagram for comparing single carrier-frequency division multiple access (SC-FDMA) and orthogonal frequency division multiple access (OFDMA)

FIG. 3 is a diagram for comparing single carrier-frequency division multiple access (SC-FDMA) and orthogonal frequency division multiple access (OFDMA).

OFDMA uses multiple subcarriers and thus has a relatively high peak-to-average power ratio (PAPR) due to overlapping of the subcarriers. Accordingly, DL signal transmission uses OFDMA and UL signal transmission uses SC-FDMA in a 3GPP system (e.g. LTE system).

Referring to FIG. 3, a UE for UL signal transmission and a BS for DL signal transmission commonly include a serial-to-parallel converter 31, a subcarrier mapper 33, an M-point inverse discrete Fourier transform (IDFT) module 34, a parallel-to-serial converter 35, and a CP addition module 36.

However, the UE for transmitting a signal using SC-FDMA further includes an N-point discrete Fourier transform (DFT) module 32. N data symbols formed by the serial-to-parallel converter 31 are input to the N-point DFT module 32. In this case, N data symbol components are spread over an allocated band. Then, when it is assumed that a band corresponding to N subcarriers is allocated to the UE, an output signal of the N-point DFT module 32 is mapped to an allocated position in the whole uplink system band (input of the M-point IDFT module 34). That is, the N-point DFT module 32 partially offsets the influence of IDFT of the M-point IDFT module 34 such that a transmission signal has single carrier property.

3. Data Transmission Scheme of D2D Communication According to the Present Invention 3.1. Comparison of Data Transmission Schemes of Cellular Communication and D2D Communication As described above in Section 2 with reference to FIG. 3, cellular communication (for example, 3GPP LTE, LTE-A, etc.) may use different UL and DL transmission schemes. For example, a 3GPP LTE system uses SC-FDMA as a UL transmission scheme and uses OFDMA as a DL transmission scheme in consideration of a PAPR.

However, in the case of D2D communication, a D2D device may preferably transmit and receive data using only one scheme (for example, SC-FDMA). When the D2D device uses two schemes to transmit and receive data, the D2D device needs different types of transmission/reception hardware and software corresponding to the two schemes and thus has problems in size, costs, etc.

That is, the D2D device may preferably transmit data using one of UL and DL transmission schemes of a cellular network.

3.2. D2D Communication Using UL Transmission Scheme

A D2D device may transmit data using only a UL transmission scheme of a cellular network. When D2D communication is performed in the same band as the cellular network and the UL transmission scheme of the cellular network is used, interference in the cellular network may be minimized. For example, the D2D device may transmit data using a physical channel used for UL transmission in an LTE/LTE-A network, for example, a PUCCH or a PUSCH.

FIG. 4 is a diagram illustrating the structure of a UL subframe.

Referring to FIG. 4, the UL subframe may be divided into a control region and a data region in the frequency domain. A PUCCH for carrying UCI is allocated to the control region. A PUSCH for carrying packet data is allocated to the data region.

In a 3GPP LTE system, considering single carrier property, one UE does not simultaneously transmit the PUCCH and the PUSCH (However, simultaneous transmission is allowed in a 3GPP LTE-A system). A resource block (RB) pair is allocated to each subframe of the PUCCH for one UE. RBs included in the RB pair occupy different subcarriers in two slots. In other words, the RB pair allocated to the PUCCH performs frequency hopping at a slot boundary.

FIG. 5 is a diagram for describing a signal processing operation of a UE to transmit a UL signal.

To transmit a UL signal, a scrambling module 51 of the UE may scramble a transmission signal using a UE-specific scramble signal. The scrambled signal is input to a modulation mapper 52 and is modulated into complex symbols using binary phase shift keying (BPSK), quadrature phase shift keying (QPSK), or quadrature amplitude modulation (16QAM/64QAM) according to the type of the transmission signal and/or a channel state. In this case, when only control information is transmitted on a PUSCH in D2D communication, modulation may be performed using QPSK only. The modulated complex symbols are processed by a conversion precoder 53 and then input to an RE mapper 54, and the RE mapper 54 may map the complex symbols to time-frequency REs. The signal processed as described above may be transmitted through an SC-FDMA signal generator 55 via an antenna to another D2D device.

FIG. 6 is a diagram for describing a signal mapping scheme in the frequency domain to satisfy single carrier property.

FIG. 6(a) illustrates a localized mapping scheme, and FIG. 6(b) illustrates a distributed mapping scheme. The localized mapping scheme is defined for a 3GPP LTE system.

In clustered SC-FDMA modified from SC-FDMA, for subcarrier mapping, DFT process output samples are divided into sub-groups and the sub-groups are discontinuously mapped to the subcarrier domain. Filtering and cyclic extension may be included as necessary. In this case, each sub-group may be called a cluster, and cyclic extension means insertion of a guard interval longer than maximum delay spread of a channel between contiguous symbols to prevent inter-symbol interference (ISI) when the subcarrier symbols are transmitted on a multi-path channel.

Figure 7:
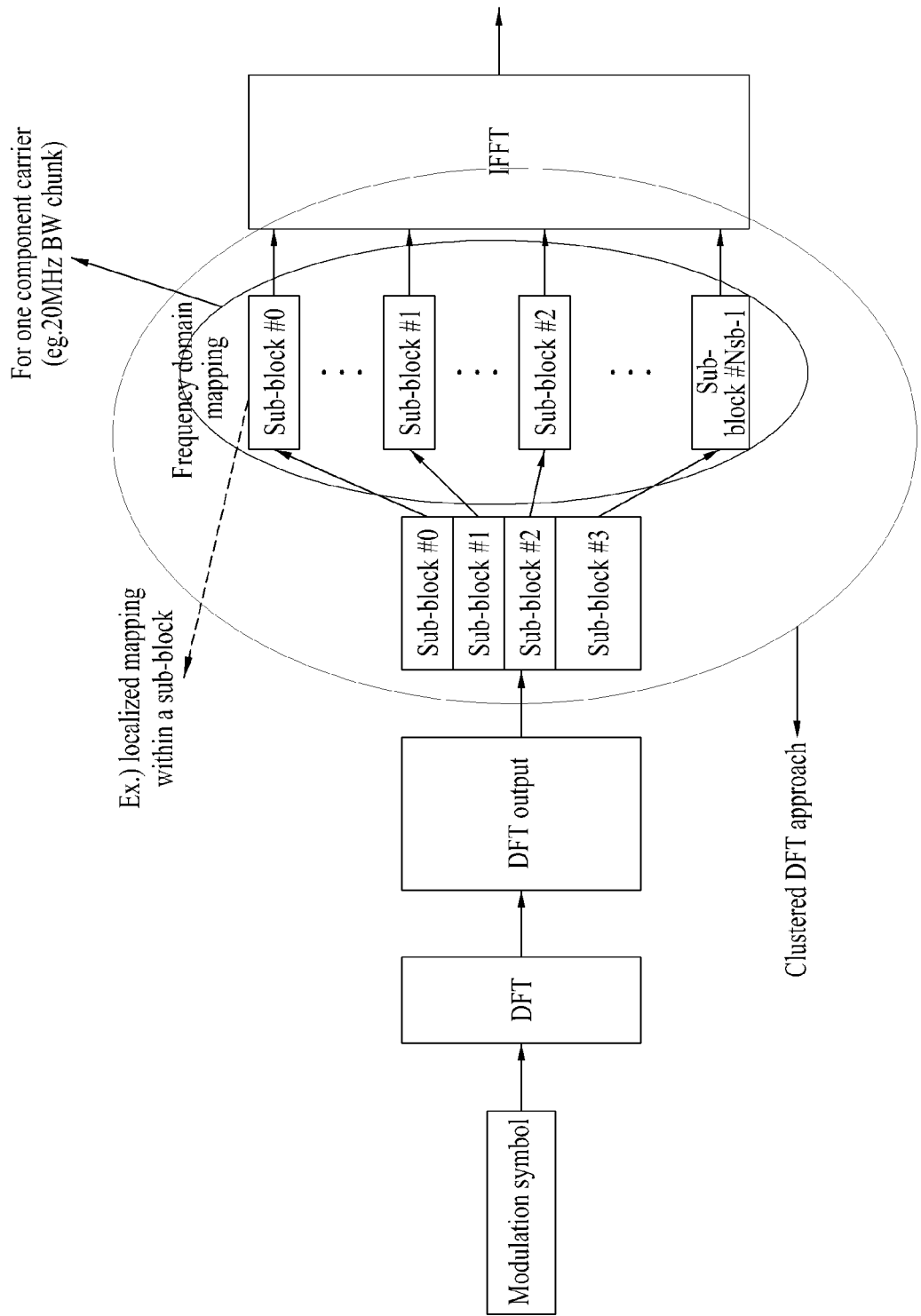
FIG. 7 is a diagram illustrating a signal processing operation for mapping discrete Fourier transform (DFT) process output samples to single carriers in clustered SC-FDMA.
Figure 8:
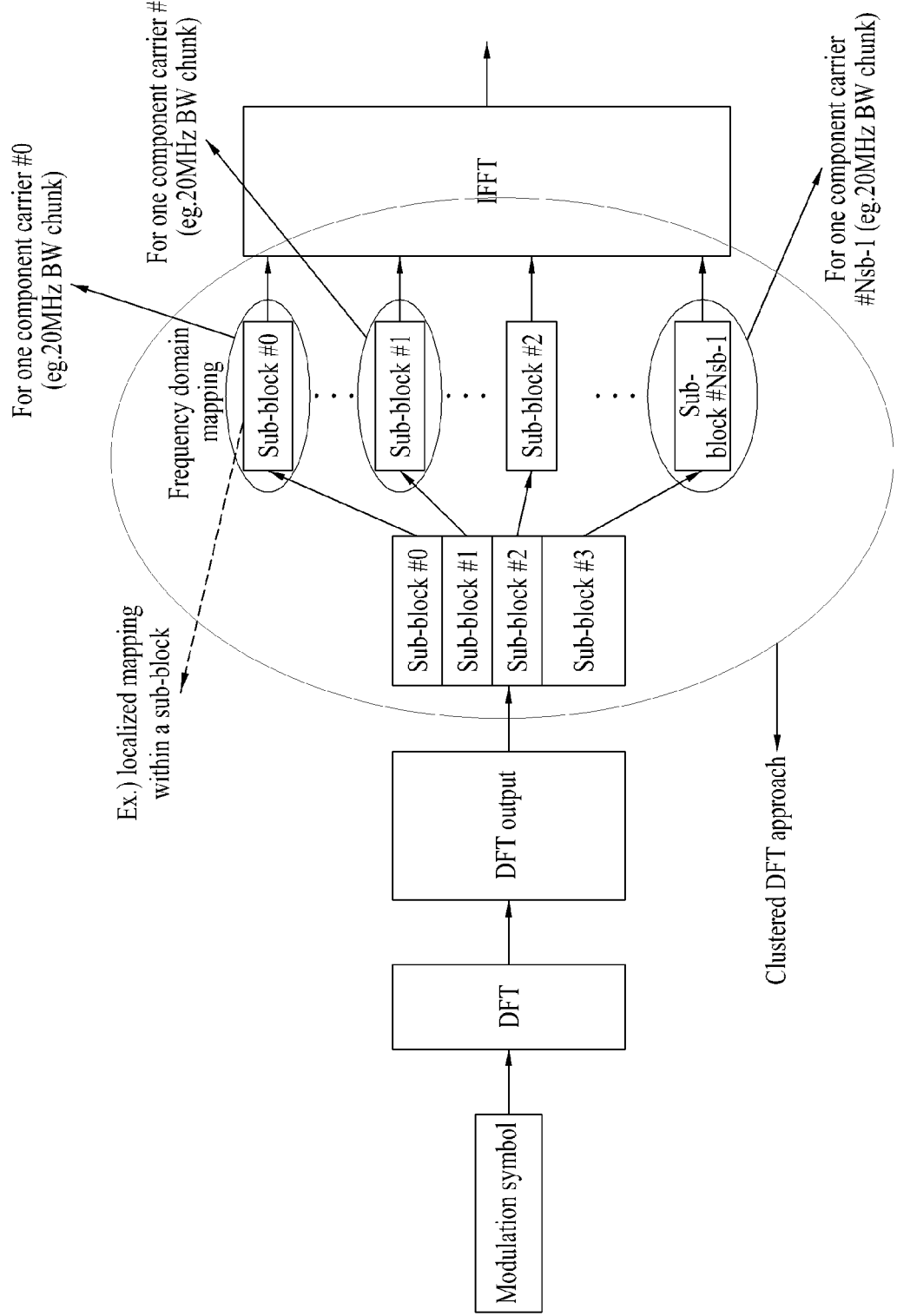
FIGS. 8 and 9 are diagrams illustrating signal processing operations for mapping DFT process output samples to multiple carriers in clustered SC-FDMA.
Figure 9:
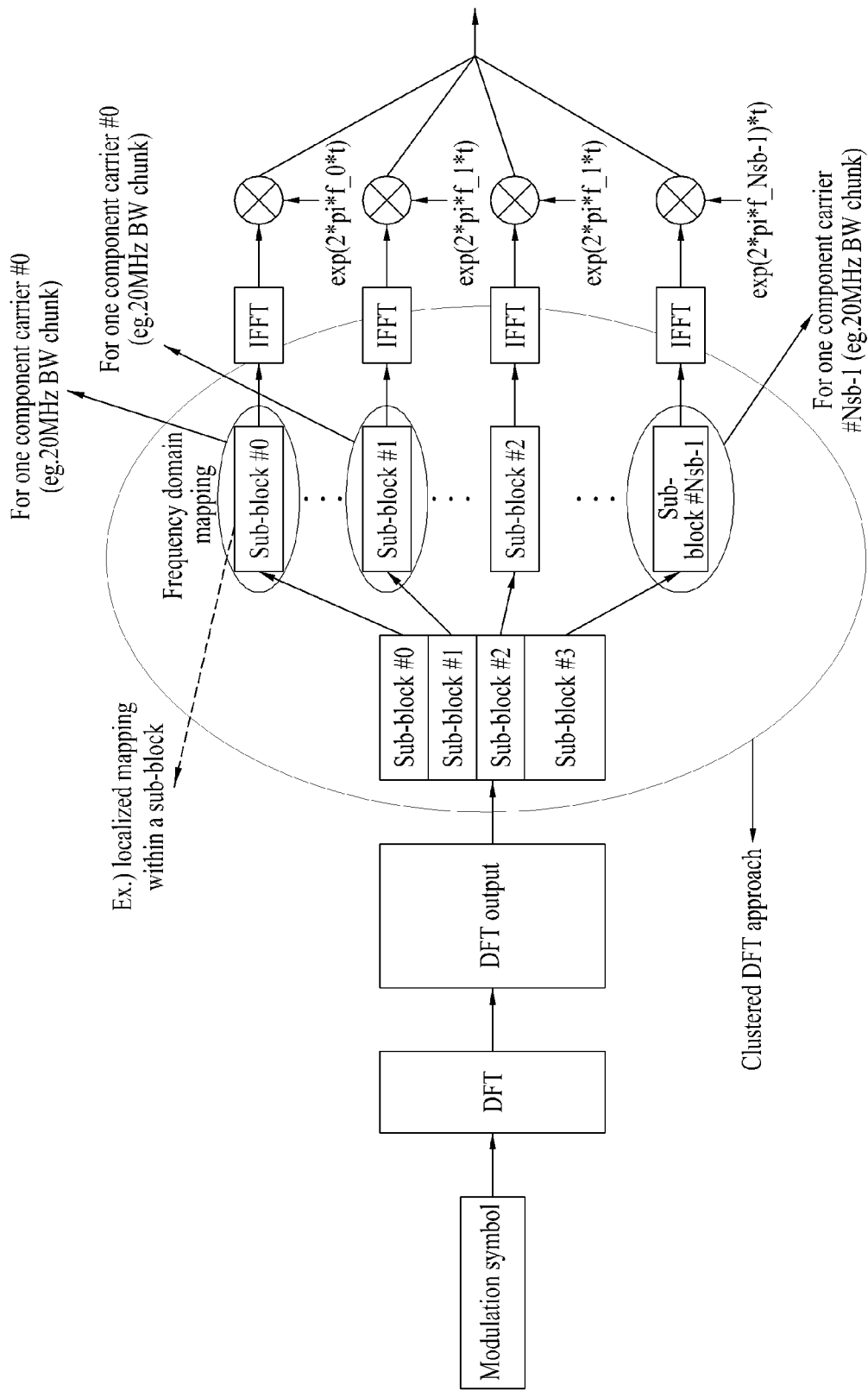

FIG. 7 is a diagram illustrating a signal processing operation for mapping DFT process output samples to single carriers in clustered SC-FDMA. FIGS. 8 and 9 are diagrams illustrating signal processing operations for mapping DFT process output samples to multiple carriers in clustered SC-FDMA;

FIG. 7 shows an example of intra-carrier clustered SC-FDMA, and FIGS. 8 and 9 show examples of inter-carrier clustered SC-FDMA. In addition, FIG. 8 shows a case that a signal is generated using a single inverse fast Fourier transform (IFFT) block when component carriers are contiguously allocated in the frequency domain and thus subcarrier spacing alignment is achieved. FIG. 9 shows a case that a signal is generated using a plurality of IFFT blocks when component carriers are non-contiguously allocated in the frequency domain.

Segmented SC-FDMA is a simple extension of DFT spreading and IFFT subcarrier mapping structures of existing SC-FDMA as the number of DFT blocks is equal to the number of IFFT blocks to achieve one-to-one correspondence. In this regard, segmented SC-FDMA may also be called NxSC-FDMA or NxDFT spread OFDMA (NxDFT-s-OFDMA).

Figure 10:
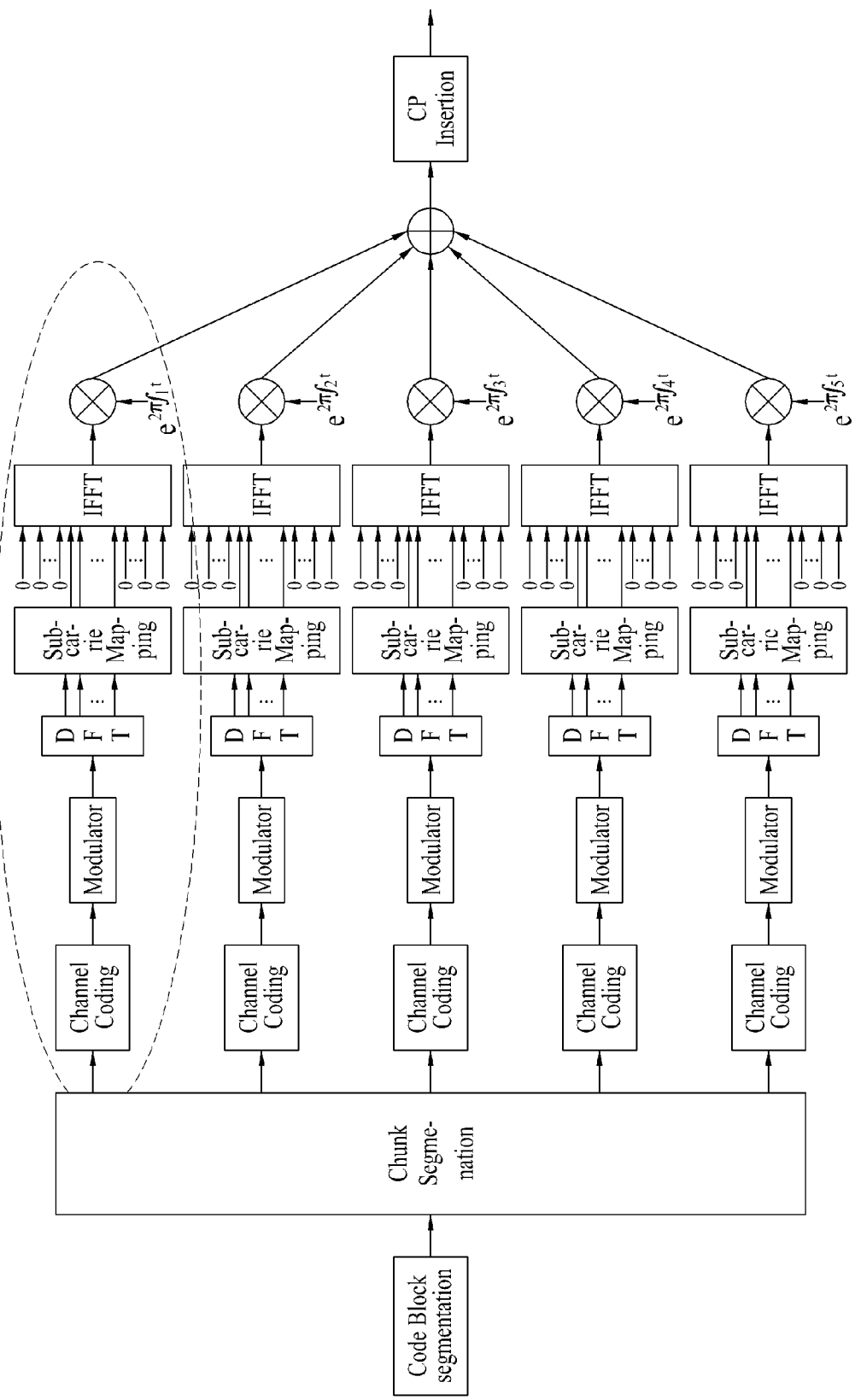
FIG. 10 is a diagram illustrating a signal processing operation in segmented SC-FDMA.

FIG. 10 is a diagram illustrating a signal processing operation in segmented SC-FDMA.

Referring to FIG. 10, segmented SC-FDMA is characterized in that time-domain modulation symbols are divided into N groups (N being an integer greater than 1) and DFT is performed on a group basis to relieve the single carrier property constraint.

Figure 11:
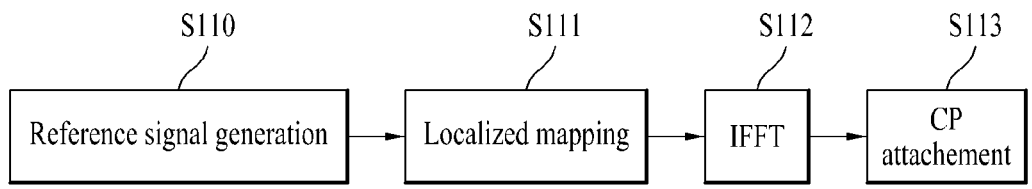
FIG. 11 is a diagram for describing a signal processing operation for transmitting a reference signal (RS) in uplink.

FIG. 11 is a diagram for describing a signal processing operation for transmitting a reference signal (RS) in uplink.

A data part is generated as a signal in the time domain, is mapped to the frequency domain through a DFT precoder, and is transmitted through IFFT. However, the RS does not pass through the DFT precoder. The RS is directly generated in the frequency domain (S110) and then transmitted sequentially through localized mapping (S111), IFFT (S112), and cyclic prefix (CP) addition (S113).

Figure 12:
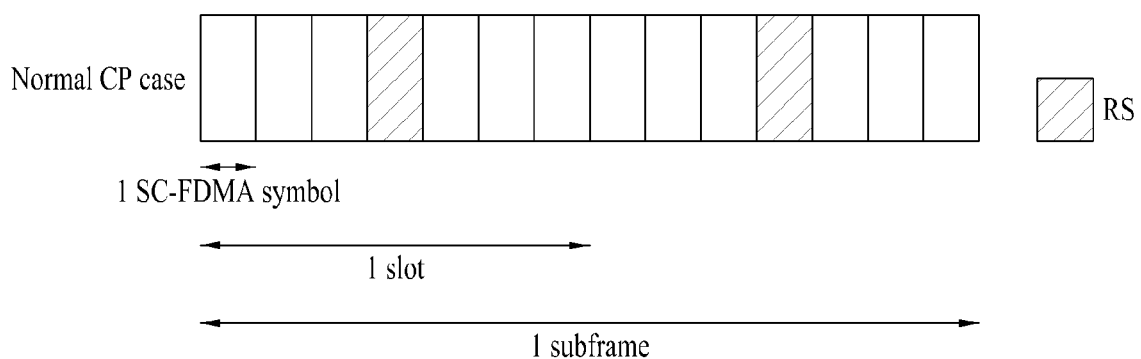
FIG. 12 is a diagram illustrating the structure of a subframe for transmitting an RS in the case of a normal cyclic prefix (CP)
Figure 13:
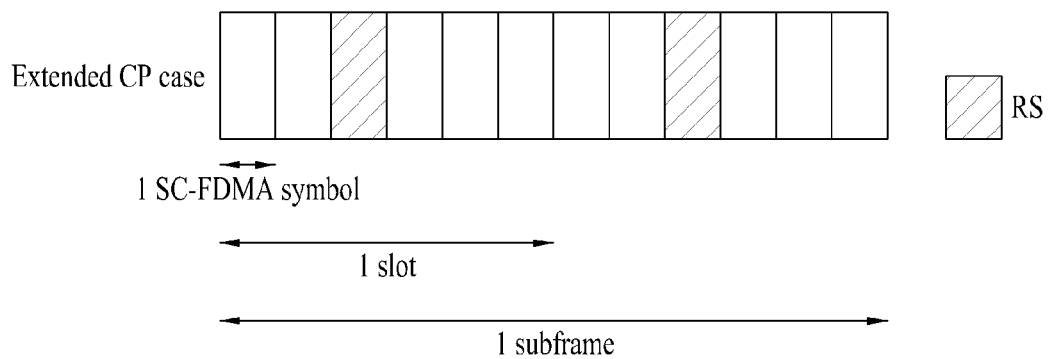
FIG. 13 is a diagram illustrating the structure of a subframe for transmitting an RS in the case of an extended CP.

FIG. 12 is a diagram illustrating the structure of a subframe for transmitting an RS in the case of a normal CP, and FIG. 13 is a diagram illustrating the structure of a subframe for transmitting an RS in the case of an extended CP.

Referring to FIG. 12, in the case of the normal CP, an RS is transmitted using $4^{th}$ and $11^{th}$ SC-FDMA symbols ($4^{th}$ symbol of each slot) of a subframe. On the other hand, referring to FIG. 13, in the case of the extended CP, an RS is transmitted using $3^{rd}$ and $9^{th}$ SC-FDMA symbols ($3^{rd}$ symbol of each slot) of a subframe.

3.3. D2D Communication Using Uplink Shared Channel (UL-SCH)

UCI to be transmitted by a UE includes ACK/NACK, CQI, and RI mostly required for DL packet data transmission and is generally transmitted on a PUCCH as described above. The PUCCH is generally transmitted using frequency resources at two ends of an operating frequency band of a system. In a 3GPP LTE system, considering single carrier property, when packet data is transmitted on a PUSCH, control information is not transmitted on a PUCCH at the same time (However, simultaneous transmission is allowed in a 3GPP LTE-A system). Accordingly, in the 3GPP LTE system, a control channel is transmitted using frequency resources of a data channel in a period in which a UE transmits packet data.

When D2D communication is performed in a cellular communication network (for example, 3GPP LTE or LTE-A communication network), a control channel may not be separately used but multiplexed with a PUSCH for transmission. In this case, interference in an uplink control channel of the existing cellular network due to D2D communication may be eliminated.

Meanwhile, in order to transmit a transport channel and control information, channel coding for preventing an error on a physical channel, cyclic redundancy check (CRC)

attachment for measuring an error, rate matching for matching the number of transmission bits of a physical channel, etc. are performed. The above-mentioned operations are now described in detail.

3.3.1. Outline of UL-SCH Signal Processing Procedure

Figure 14:
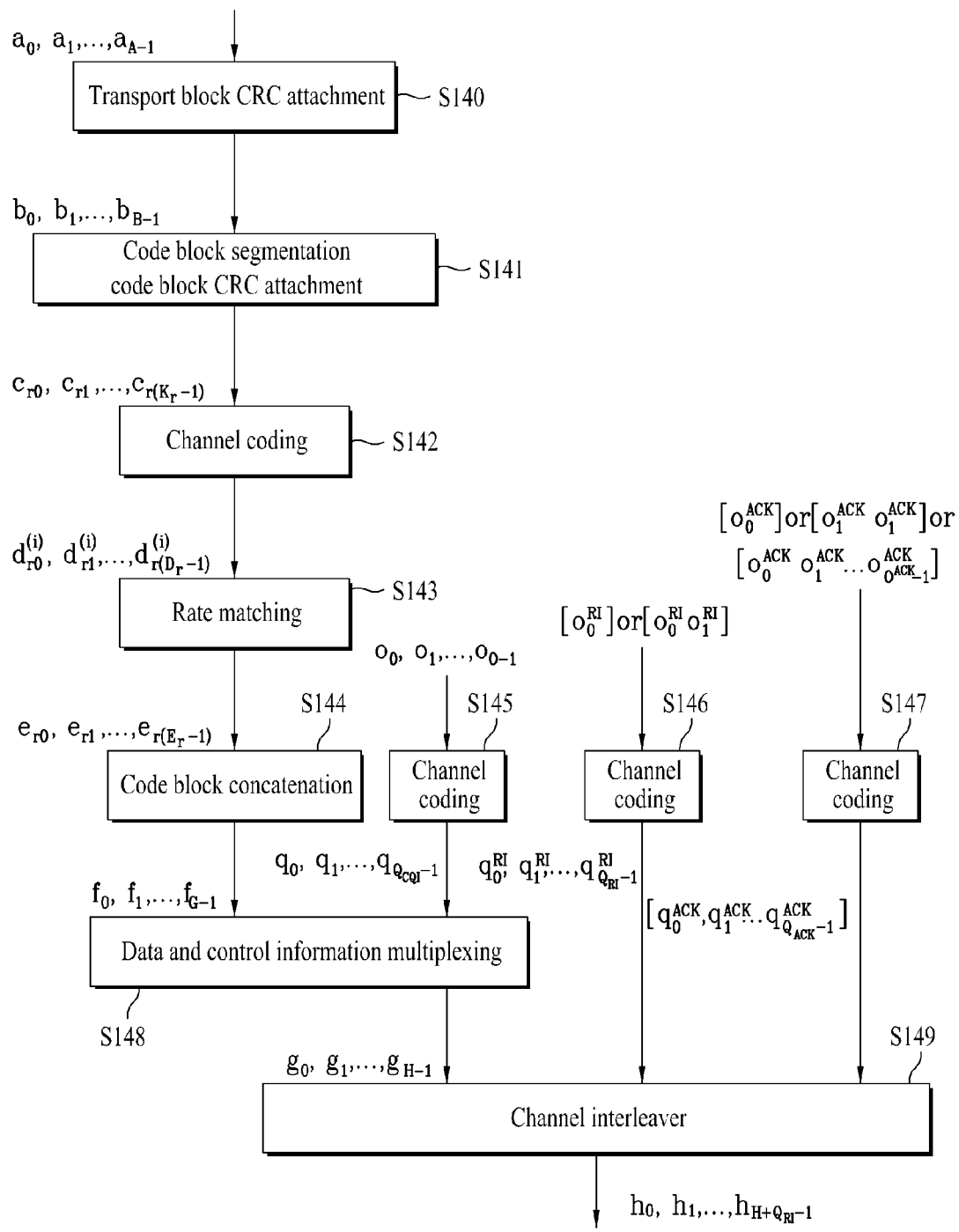
FIG. 14 is a diagram illustrating a signal processing operation of an uplink shared channel (UL-SCH) among UL transport channels.

Referring to FIG. 14, a UL-SCH transmits data to a coding unit in the form of a transport block (TB) once at every transmission time interval (TTI).

CRC parity bits $p_0, p_1, p_2, p_3, \ldots, p_{L-1}$ are attached to bits $a_0, a_1, a_2, a_3, \ldots, a_{A-1}$ of a TB transmitted from an upper layer (S140). Here, A denotes the size of the TB, and L denotes the number of parity bits. The CRC-attached input bits are $b_0, b_1, b_2, b_3, \ldots, b_{B-1}$. Here, B denotes the number of bits of the TB including the CRC bits.

$b_0, b_1, b_2, b_3, \ldots, b_{B-1}$ are segmented into a plurality of code blocks (CBs) according to the size of the TB, and the CRC bits are attached to the segmented CBs (S141). The segmented and CRC-attached bits are $c_{r0}, c_{r1}, c_{r2}, c_{r3}, \ldots, c_{r(K_r-1)}$. Here, r denotes a CB index (r=0, ..., C−1), and Kr denotes the number of bits of a CB r. C denotes a total number of CBs.

Then, channel coding is performed (S142). The channel-coded bits are $d_{r0}^{(i)}, d_{r1}^{(i)}, d_{r2}^{(i)}, d_{r3}^{(i)}, \ldots, d_{r(D_r-1)}^{(i)}$. Here, i denotes a coded stream index and may have a value of 0, 1, or 2. $D_r$ denotes the number of bits of an $i^{th}$ coded stream for the CB r. r denotes a CB index (r=0, ..., C−1), and C denotes a total number of CBs. Each CB may be coded using turbo coding.

Then, rate matching is performed (S143). The rate-matched bits are $d_{r0}, d_{r1}, d_{r2}, d_{r3}, \ldots, d_{r(E_r-1)}$. Here, r denotes a CB index (r=0, ..., C−1), and C denotes a total number of CBs. $E_r$ denotes the number of rate-matched bits of the CB r.

Then, the CBs are concatenated (S144). The CB-concatenated bits are $f_0, f_1, f_2, f_3, \ldots, f_{G-1}$. Here, G denotes a total number of coded bits to be transmitted. When control information is multiplexed with the data to be transmitted on the UL-SCH, a number of bits used to transmit the control information are not included.

Meanwhile, channel coding is performed independently on CQI/PMI, RI, and ACK/NACK included in the control information to be transmitted on a PUSCH (S146, S147, and S148). Since different coded symbols are allocated to transmit different types of control information, the different types of control information have different coding rates.

For time division duplexing (TDD), two ACK/NACK feedback modes are supported according to higher layer configuration: ACK/NACK bundling and ACK/NACK multiplexing. ACK/NACK information includes 1 or 2 bits for ACK/NACK bundling and includes 1 to 4 bits for ACK/NACK multiplexing.

After the CBs are concatenated in step S144, the coded bits $f_0, f_1, f_2, f_3, \ldots, f_{G-1}$ of the data of the UL-SCH are multiplexed with the coded bits $q_0, q_1, q_2, q_3, \ldots, q_{N_L \cdot Q_{CQI}-1}$ of the CQI/PMI (S145). The multiplexed bits are $g_0, g_1, g_2, g_3, \ldots, g_{H'-1}$. Here, $g_i$ (i=0, ..., H'−1) denotes a column vector having a length of $(Q_m \cdot N_L)$. $H=(G+N_L \cdot Q_{CQI})$ and $H'=H/(N_L \cdot Q_m)$. $N_L$ denotes the number of layers to which the TB of the UL-SCH is mapped, and H denotes a total number of coded bits allocated for the data of the UL-SCH and the CQI/PMI to the $N_L$ transmission layers to which the TB is mapped.

Then, channel interleaving is performed on the multiplexed data and CQI/PMI, and the independently channel-coded RI and ACK/NACK to generate an output signal (S149).

3.3.2. Resource Element (RE) Mapping

Mapping of physical REs for data and a control channel will now be described.

Figure 15:
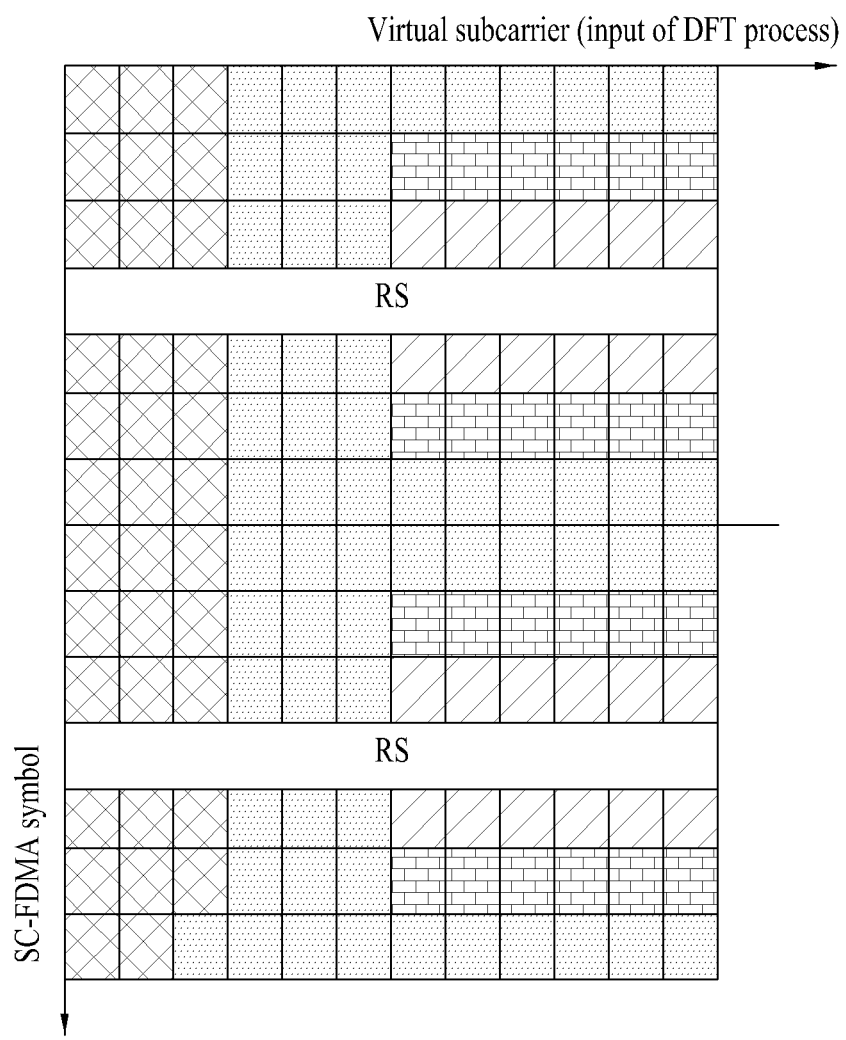
FIG. 15 is a diagram for describing physical resource element (RE) mapping for UL data and control channel transmission.

FIG. 15 is a diagram for describing physical RE mapping for UL data and control channel transmission.

Referring to FIG. 15, CQI/PMI and data may be mapped to REs in a time-first manner. The CQI and data are multiplexed using serial concatenation. Coded ACK/NACK is punctured into next to demodulation reference signal (DMRS) symbols. The ACK/NACK is punctured starting from the bottom sub-carrier among virtual subcarriers by reducing (removing) CQI resources. RI is rate-matched regardless of ACK/NACK transmission and is mapped to REs adjacent to the ACK/NACK. Resources for the RI and ACK/NACK may occupy up to four SC-FDMA symbols.

When data and control information are simultaneously transmitted on a UL-SCH, mapping is performed in the order of RI, combined CQI/PMI and data, and ACK/NACK. That is, the RI is initially mapped, and then the combined CQI/PMI and data are mapped in a time-first manner to REs other than the REs to which the RI is mapped. The ACK/NACK is mapped by puncturing out the combined CQI/PMI and data which have been already mapped.

As described above, single carrier property may be satisfied by multiplexing data with UCI such as CQI/PMI. Accordingly, UL transmission maintaining a low cubic metric (CM) may be achieved.

3.3.3. UL-SCH Signal Transmission in Multiple-Input Multiple-Output (MIMO) System In an existing system (for example, LTE Rel-8), a UE does not simultaneously use a plurality of transmission (Tx) antennas. However, in an improved system (for example, LTE Rel-10), MIMO technology using up to four Tx antennas is applicable. UL-SCH signal transmission in a MIMO system will now be described in detail.

3.3.3.1. Outline of UL-SCH Signal Processing Procedure in MIMO System

Figure 16:
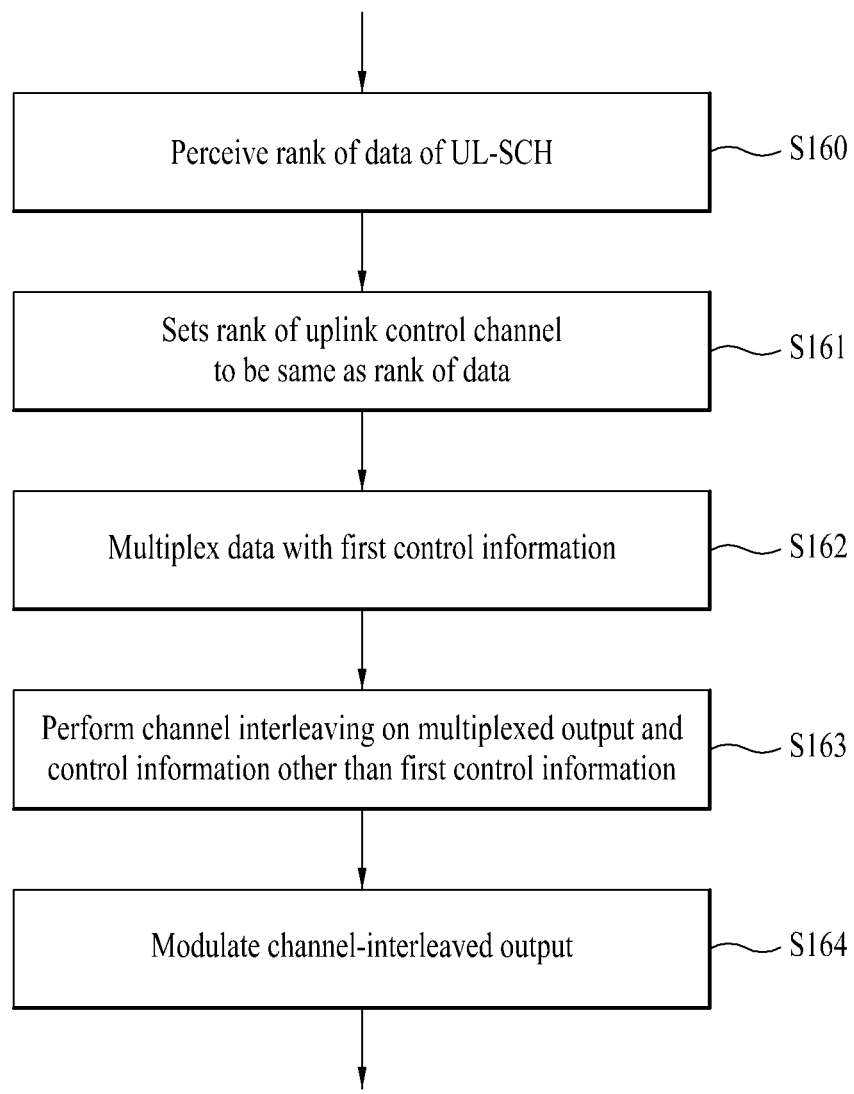
FIG. 16 is a flowchart for describing a method of multiplexing data with a control channel on a UL-SCH.

FIG. 16 is a flowchart for describing a method of multiplexing data with a control channel on a UL-SCH.

Referring to FIG. 16, a UE perceives a rank of data of a UL-SCH (S160). Then, the UE sets a rank of an uplink control channel (a channel for transmitting UCI such as CQI, ACK/NACK, and RI) to be the same as the rank of the data (S161). In addition, the UE multiplexes the data with the control channel (S162). After that, channel interleaving may be performed to map the data and CQI in a time-first manner, to map the RI to designated REs, and to puncture and map the ACK/NACK into REs next to a DMRS (S163).

After that, the data and control channel may be modulated according to a modulation and coding scheme (MCS) table using QPSK, 16-QAM, 64-QAM, etc. (S164). In this case, the modulation of the data and control channel may be performed in another step. For example, the modulation may be performed before the data is multiplexed with the control channel in step S162.

In addition, the channel interleaving may be performed on a codeword basis or a layer basis.

Figure 17:
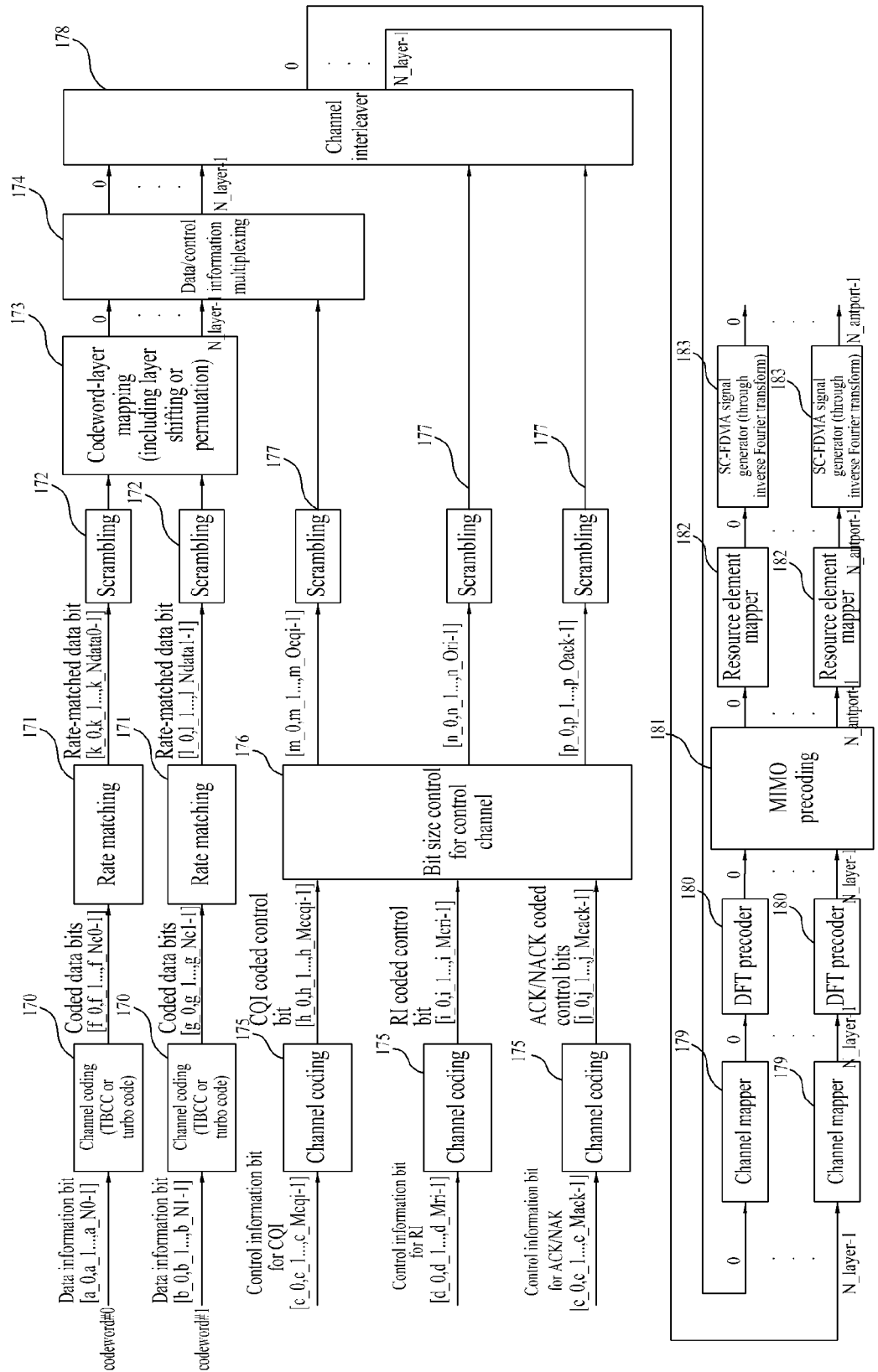
FIG. 17 is a block diagram for describing a method of generating a data and control channel transmission signal.

FIG. 17 is a block diagram for describing a method of generating a data and control channel transmission signal. The position of each block may vary according to an applied scheme.

When two codewords are assumed, channel coding is performed on each codeword (170), and rate matching is performed according to a given MCS level and a resource size (171). After that, the coded bits may be scrambled using a cell-specific, UE-specific, or codeword-specific scheme (172).

After that, codeword-to-layer mapping is performed (173). In this case, an operation such as layer shifting or permutation may be included.

Figure 18:
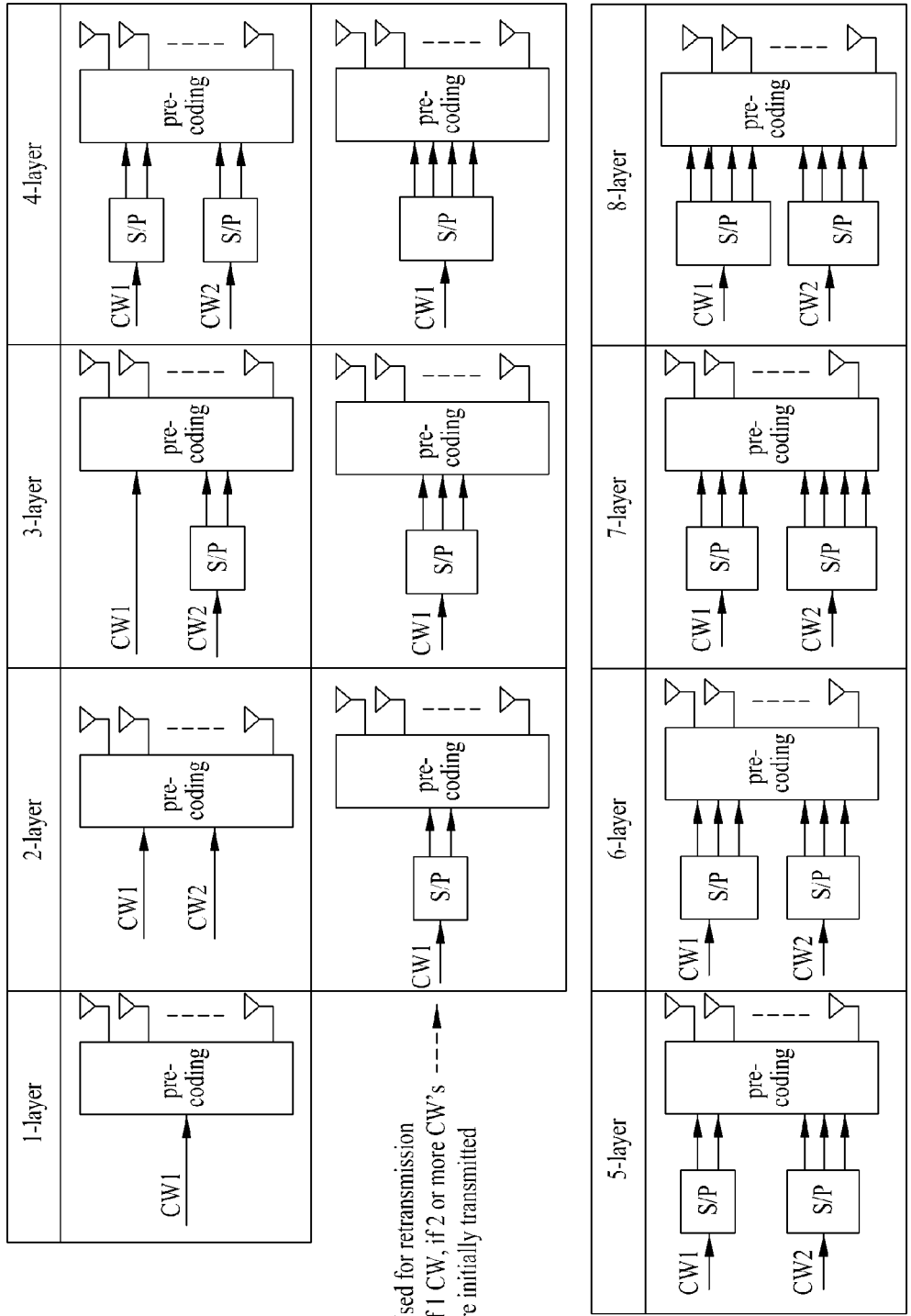
FIG. 18 is a diagram for describing codeword-to-layer mapping.

FIG. 18 is a diagram for describing codeword-to-layer mapping. The codeword-to-layer mapping may be performed using the rule illustrated in FIG. 18. Positions where precoding is performed in FIG. 18 may be different from those in FIG. 17.

Referring back to FIG. 17, control information such as CQI, RI, and ACK/NACK is channel-coded according to a given specification (175). In this case, the CQI and the RI and ACK/NACK may be coded using the same channel code with respect to all codewords, or using different channel codes with respect to codewords.

After that, the number of coded bits may be changed by a bit size controller (176). The bit size controller may be integrated with the channel coding block 175. The signal output from the bit size controller is scrambled (177). In this case, scrambling may be performed cell-specifically, layer-specifically, codeword-specifically, or UE-specifically.

The bit size controller may operate as described below.

(1) The bit size controller perceives a rank (n_rank_pusch) of data of a PUSCH.

(2) A rank (n_rank_control) of a control channel is set to be the same as the rank of the data (that is, n_rank_control=n_rank_pusch), the number of bits (n_bit_ctrl) of the control channel is extended by multiplexing the rank of the control channel.

One method for the above operation is to merely copy and paste the control channel. In this case, the control channel may have an information level before channel coding is performed, or a coded bit level after channel coding is performed. That is, for example, in the case of a control channel [a0, a1, a2, a3] satisfying n_bit_ctrl=4, and n_rank_pusch=2, the number of extended bits (n_ext_ctrl) may be 8 ([a0, a1, a2, a3, a0, a1, a2, a3]).

Another method is to apply a circular buffer scheme in such a manner that the number of extended bits (n_ext_ctrl) is 8 as described above.

Limiting the rank of the control channel to be the same as the rank of the data channel as described above has an effect of reducing signaling overhead because, when the rank of the data channel is different from the rank of the control channel, PMI signaling for the control channel is additionally required to precode a UL DMRS the same as the data. The same RIs of the data channel and control channel may not only simplify multiplexing but also remove additional signaling. Even when the control channel has one effective rank, a transmission rank of the control channel may be the same as the rank (n_rank_pusch) of the data. After a transmitter side applies a MIMO decoder to each layer, log-likelihood ratio (LLR) outputs may be accumulated using a maximum ratio combining (MRC) means.

When the bit size controller and the channel coder are formed as one element, coded bits may be generated by applying channel coding and rate matching defined for an existing system (for example, LTE Rel-8).

In addition to the bit size controller, bit level interleaving may be performed to further randomize layers. Equivalently, interleaving may be performed at the modulation symbol level.

The CQI/PMI channel may be multiplexed with the data with respect to two codewords by a data/control multiplexer (174). After that, a channel interleaver maps the CQI/PMI in a time-first manner while mapping the ACK/NACK information to REs next to a UL DMRS in two slots of a subframe (178).

Modulation is performed on each layer (179), and DFT precoding (180), MIMO precoding (181), RE mapping (182), etc. are sequentially performed. After that, an SC-FDMA signal is generated and transmitted through an antenna port (183).

The positions of the above-described functional blocks are not limited to the positions illustrated in FIG. 17 and may be changed. For example, the scrambling blocks (172, 197) may be disposed after the channel interleaving block. In addition, the codeword-to-layer mapping block (173) may be disposed after the channel interleaving block (178) or the modulation mapper block (179).

3.3.3.2. RE Mapping in MIMO System

Figure 19:
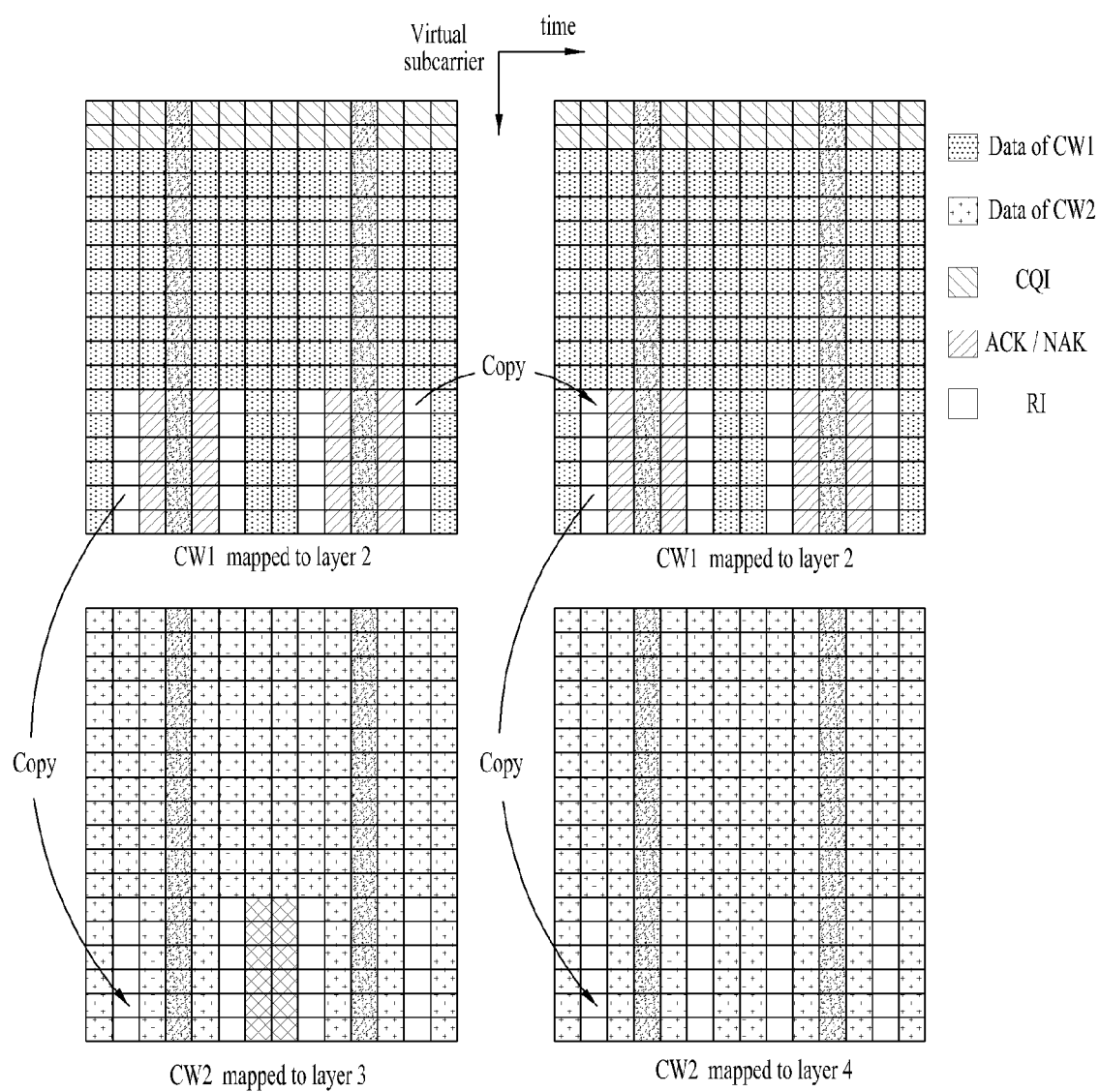
FIG. 19 is a diagram illustrating physical RE mapping for UL data and control channel transmission in the case of two codewords and four layers.

FIG. 19 is a diagram illustrating physical RE mapping for UL data and control channel transmission in the case of two codewords and four layers.

A CQI is combined with data and mapped in a time-first manner to REs other than the REs to which an RI is mapped, using all constellation points at the same modulation order as the data. In the case of single user MIMO (SU-MIMO), the CQI is spread to one codeword and transmitted. For example, the CQI is transmitted in a codeword having a high MCS level between the two codewords. When the two codewords have the same MCS level, the CQI is transmitted in codeword 0.

An ACK/NACK is disposed by puncturing out the combined CQI and data which have been already mapped to symbols disposed at two sides of a RS. Since the RS is disposed at $3^{rd}$ and $10^{th}$ symbols, the ACK/NACK is mapped upward starting from the bottom subcarrier of $2^{nd}$, $4^{th}$, $9^{th}$, and $11^{th}$ symbols. In this case, the ACK/NACK is mapped in the order of $2^{nd}$, $11^{th}$, $9^{th}$, and $4^{th}$ symbols.

An RI is mapped to symbols disposed adjacent to the ACK/NACK. The RI is mapped first among all types of information (data, CQI, ACK/NACK, and RI) transmitted on a PUSCH. Specifically, the RI is mapped upward starting from the bottom subcarrier of $1^{st}$, $5^{th}$, $8^{th}$, and $12^{th}$ symbols. In this case, the RI is mapped in the order of $1^{st}$, $12^{th}$, $8^{th}$, and $5^{th}$ symbols.

Particularly, when each of the ACK/NACK and RI has one or two bits, the ACK/NACK and RI may be mapped based on a scheme such as QPSK using only four corners of a constellation. When each of the ACK/NACK and RI has three or a larger number of bits, the ACK/NACK and RI may be mapped using all constellation points at the same modulation order as the data. In addition, each of the ACK/NACK and RI carries the same information using the same resources at the same positions in all layers.

3.3.4. REs for UCI

When UCI is transmitted using a PUCCH, the number of bits to be channel-coded and actually transmitted on the PUCCH is fixed according to the type of UCI. In addition, the reception quality may be maintained in a desired level by increasing or reducing Tx power. However, when the UCI is transmitted together with data in a PUSCH region, the Tx power should be set to be the same as that of the data. In this case, when the data has a high spectral efficiency or high MCS level, a reception signal to noise ratio (SNR) per symbol is high. When a low spectral efficiency or low MCS level is used, the SNR is low. In this case, the number of transmission symbols of the UCI needs to be changed in consideration of the data to maintain the reception quality of the UCI. In this regard, in an LTE system, the number of symbols required to transmit the UCI is changed according to the spectral efficiency of the data transmitted on the PUSCH.

The following description is provided based on an SU-MIMO environment but is also applicable to single antenna transmission as a special case of SU-MIMO. In the case of single antenna transmission, control information may be transmitted based on a device-specific RS. In this case, the device-specific RS may be applied to the same position as a DMRS used in a cellular network (for example, LTE-A).

3.3.4.1. Number of REs Used for CQI (or PMI)

When a UE transmits CQI (or PMI) bits on a PUSCH, the number of REs for the CQI (or PMI) in each layer may be calculated according to Equation 1. Here, the number of REs for the CQI (or PMI) may be expressed as the number Q' of coded modulation symbols.

An offset value required to calculate the number of REs may be calculated using a channel state estimated from an RS or ACK/NACK information received from another device, be received from another device with which D2D communication is performed, or be received from a BS through higher layer signaling.

The following description is provided based on the CQI but is also applicable to the PMI.

$$Q' = \min\left(\left\lceil \frac{(O+L) \cdot M_{sc}^{PUSH\text{-}initial} \cdot N_{symb}^{PUSCH\text{-}initial} \cdot \beta_{offset}^{PUSCH}}{\sum_{r=0}^{C^{(x)}-1} K_r^{(x)}} \right\rceil, \right.$$
$$\left. M_{sc}^{PUSCH} \cdot N_{symb}^{PUSCH} - \frac{Q_{RI}}{Q_m}\right)$$
[Equation 1]

Here, O denotes the number of bits of the CQI. L denotes the number of CRC bits. L has a value of 0 when O is equal to or less than 11, and has a value of 8 otherwise. That is, $$L = \begin{cases} 0 & O \leq 11 \\ 8 & \text{otherwise.} \end{cases}$$

$\beta_{offset}^{CQI}$ is determined according to the number of transmission codewords for a TB. Parameters for setting offset values in consideration of the SNR difference between data and UCI are determined as $\beta_{offset}^{PUSCH} = \beta_{offset}^{CQI}$.

$M_{sc}^{PUSCH}$ denotes a bandwidth allocated (scheduled) for PUSCH transmission in a current subframe for a TB, expressed as the number of subcarriers. $N_{symb}^{PUSCH}$ denotes the number of SC-FDMA symbols per subframe for initial PUSCH transmission and may be calculated as represented by Equation 2.

$$N_{symb}^{PUSCH} = (2 \cdot (N_{symb}^{UL} - 1) - N_{SRS})$$
[Equation 2]

Here, $N_{SRS}$ may be set to 1 when a UE transmits a PUSCH and sounding reference signal (SRS) in the same subframe or when PUSCH resources allocated for initial transmission are at least partially overlapped with a subframe and frequency bandwidth of a cell-specific SRS, and may be set to 0 otherwise.

$N_{symb}^{PUSCH\text{-}initial}$ denotes the number of SC-FDMA symbols per subframe for initial PUSCH transmission for the same TB, and $M_{sc}^{PUSCH\text{-}initial}$ denotes the number of subcarriers. In $K_r^{(x)}$, x denotes the index of a TB having the highest MCS designated by a UL grant.

$M_{sc}^{PUSCH\text{-}initial}$, C, and $K_r^{(x)}$ may be obtained from an initial PDCCH for the same TB mentioned above. When these values are not included in the initial PDCCH (DCI format 0), the values may be determined in a different manner. Specifically, when an initial PUSCH for the same TB mentioned above is scheduled semi-persistently, or when the PUSCH is indicated by a PDCCH, which has lastly indicated semi-persistent scheduling, or a random access response grant, $M_{sc}^{PUSCH\text{-}initial}$, C, and $K_r^{(x)}$ may be determined from a random access response grant for the same TB mentioned above.

Data G of a UL-SCH is as represented by Equation 3.

$$G = N_{symb}^{PUSCH} \cdot N_{sc}^{PUSCH} \cdot Q_m - Q_{CQI} - Q_{RI}$$
[Equation 3]

When the number of REs for the CQI is determined as described above, the number of channel-coded bits of the CQI may be calculated in consideration of a modulation scheme. $Q^{CQI}$ is a total number of coded bits of the CQI and $Q_{CQI} = Q_m \cdot Q'$. Here, $Q_m$ is the number of bits per symbol according to a modulation order, 2 in QPSK, 4 in 16QAM, and 6 in 64QAM. Since resources for the RI are first allocated, the number of REs allocated to the RI is excluded. When the RI is not transmitted, $Q_{RI} = 0$.

3.3.4.2. Number of REs Used for ACK/NACK (or RI)

When a UE transmits ACK/NACK (or RI) bits on a PUSCH, the number of REs for the ACK/NACK (or RI) per layer may be calculated according to Equation 4. Here, the number REs for the ACK/NACK (or RI) may be expressed as the number Q' of coded modulation symbols.

$$Q' = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, \right.$$
$$\left. 4 \cdot M_{sc}^{PUSCH}\right)$$
[Equation 4]

Here, O denotes the number of bits of the ACK/NACK (or RI).

$\beta_{offset}^{HARQ\text{-}ACK}$ and $\beta_{offset}^{RI}$ are determined according to the number of transmission codewords for a TB. Parameters for setting offset values in consideration of the SNR difference between data and UCI are determined as $\beta_{offset}^{PUSCH} = \beta_{offset}^{HARQ\text{-}ACK}$ and $\beta_{offset}^{PUSCH} = \beta_{offset}^{RI}$.

$M_{sc}^{PUSCH}$ denotes a bandwidth allocated (scheduled) for PUSCH transmission in a current subframe for a TB, expressed as the number of subcarriers.

$N_{symb}^{PUSCH\text{-}initial}$ denotes the number of SC-FDMA symbols per subframe for initial PUSCH transmission, and $M_{sc}^{PUSCH\text{-}initial}$ denotes the number of subcarriers. $N_{symb}^{PUSCH\text{-}initial}$ is represented by Equation 5.

$$N_{symb}^{PUSCH\text{-}initial} = (2 \cdot (N_{symb}^{UL} - 1) - N_{SRS})$$
[Equation 5]

Here, $N_{SRS}$ may be set to 1 when a UE transmits a PUSCH and SRS in the same subframe or when PUSCH resources allocated for initial transmission are at least partially overlapped with a subframe and frequency bandwidth of a cell-specific SRS, and may be set to 0 otherwise.

$M_{sc}^{PUSCH\text{-}initial}$, C, and $K_r^{(x)}$, x={0,1} may be obtained from an initial PDCCH for the same TB mentioned above. When these values are not included in the initial PDCCH (DCI format 0 or 4), the values may be determined in a different manner. Specifically, when an initial PUSCH for the same TB mentioned above is scheduled semi-persistently, or when the PUSCH is indicated by a PDCCH, which has lastly indicated semi-persistent scheduling, or a random access response grant, $M_{sc}^{PUSCH\text{-}initial}$, C, and $K_r^{(x)}$, x={0,1} may be determined from a random access response grant for the same TB mentioned above.

When the number of REs for the ACK/NACK (or RI) is determined as described above, the number of channel-coded bits of the ACK/NACK (or RI) may be calculated in consideration of a modulation scheme. A total number of coded bits of the ACK/NACK is $Q_{ACK} = Q_m \cdot Q'$, and a total number of coded bits of the RI is $Q_{RI} = Q_m \cdot Q'$. Here, $Q_m$ is the number of bits per symbol according to a modulation order, 2 in QPSK, 4 in 16QAM, and 6 in 64QAM.

3.3.4.3. Number of REs when Only UCI is Transmitted

When only UCI is transmitted on a PUSCH without UL-SCH data, the number Q' of REs for ACK/NACK (or RI) may be calculated according to Equation 6.

$$Q' = \min\left(\left\lceil \frac{O \cdot M_{sc}^{PUSCH} \cdot N_{symb}^{PUSCH} \cdot \beta_{offset}^{PUSCH}}{O_{CQI-MIN}} \right\rceil, 4 \cdot M_{sc}^{PUSCH}\right) \quad \text{[Equation 6]}$$

Here, O denotes the number of bits of the ACK/NACK (or RI). When O denotes the number of bits of the ACK/NACK, it is determined according to two ACK/NACK feedback modes according to higher layer configuration for TDD as described above. That is, the ACK/NACK may include 1 or 2 bits for ACK/NACK bundling and include 1 to 4 bits for ACK/NACK multiplexing.

$O_{CQI-MIN}$ denotes the number of CQI bits including CRC bits when a rank is 1. $M_{sc}^{PUSCH}$ denotes a bandwidth allocated (scheduled) for PUSCH transmission in a current subframe for a TB, expressed as the number of subcarriers.

$N_{symb}^{PUSCH}$ denotes the number of SC-FDMA symbols in a current subframe for PUSCH transmission. $N_{symb}^{PUSCH}$ is represented by Equation 7.

$$N_{symb}^{PUSCH} = (2 \cdot (N_{symb}^{UL} - 1) - N_{SRS}) \quad \text{[Equation 7]}$$

Here, $N_{SRS}$ may be set to 1 when a UE transmits a PUSCH and SRS in a subframe the same as the current subframe or when PUSCH resources allocated to the current subframe are at least partially overlapped with a subframe and frequency bandwidth of a cell-specific SRS, and may be set to 0 otherwise.

Parameters for setting offset values in consideration of the SNR difference between data and UCI are determined as $\beta_{offset}^{PUSCH} = \beta_{offset}^{HARQ-ACK}/\beta_{offset}^{CQI}$ and $\beta_{offset}^{PUSCH} = \beta_{offset}^{RI}/\beta_{offset}^{CQI}$.

When the number of REs for the ACK/NACK (or RI) is determined as described above, the number of channel-coded bits of the ACK/NACK (or RI) may be calculated in consideration of a modulation scheme. A total number of coded bits of the ACK/NACK is $Q_{ACK} = Q_m \cdot Q'$, and a total number of coded bits of the RI is $Q_{RI} = Q_m \cdot Q'$. Here, $Q^m$ is the number of bits per symbol according to a modulation order, 2 in QPSK, 4 in 16QAM, and 6 in 64QAM.

The number of channel-coded bits of the CQI (PMI) may be calculated as represented by Equation 8.

$$Q_{CQI} = N_{symb}^{PUSCH} \cdot M_{sc}^{PUSCH} \cdot Q_m - Q_{RI} \quad \text{[Equation 8]}$$

After the number of REs for the UCI is calculated, channel coding and rate matching are performed on the UCI.

As in FIG. 14, a coded output sequence of the CQI is $q_0, q_1, q_2, q_3, \ldots, q_{Q_{CQI}-1}$, a vector sequence output of the coded ACK/NACK is $\underline{q}_0^{ACK}, \underline{q}_1^{ACK}, \underline{q}_2^{ACK}, \ldots, \underline{q}_{Q'_{ACK}-1}^{ACK-1}$, and a vector sequence output of the coded RI is $\underline{q}_0^{RI}, \underline{q}_1^{RI}, \underline{q}_2^{RI}, \ldots, \underline{q}_{Q'_{RI}-1}^{RI}$.

3.4. D2D Communication Using DL Transmission Scheme

A D2D device may transmit data using a DL transmission scheme of a cellular network. For example, a D2D device may transmit data using a physical channel used for DL transmission in an LTE/LTE-A network, for example, a PDCCH or a PDSCH.

In addition, when the DL transmission scheme is used, a control channel may not be separately used and transmitted on a PDSCH. That is, control information and data may be transmitted together using only the PDSCH.

Figure 20:
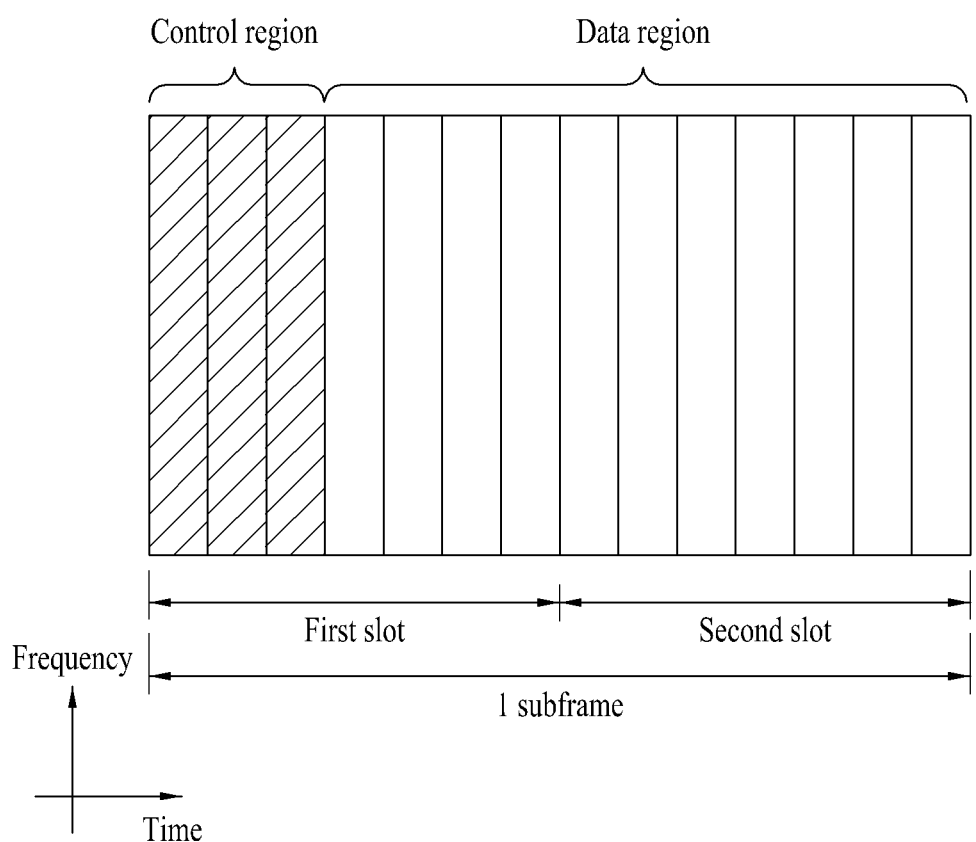
FIG. 20 is a diagram illustrating the structure of a downlink (DL) subframe.

FIG. 20 is a diagram illustrating the structure of a DL subframe.

Referring to FIG. 20, up to three initial orthogonal frequency-division multiplexing (OFDM) symbols in a first slot of a subframe correspond to a control region to which a control channel is allocated, and the other OFDM symbols correspond to a data region to which a PDSCH is allocated. Examples of downlink control channels used in 3GPP LTE include a physical control format indicator channel (PCFICH), a PDCCH, a physical HARQ indicator channel (PHICH), etc.

The PCFICH is transmitted in a first OFDM symbol of a subframe and carries information about the number of OFDM symbols used to transmit control channels in the subframe (that is, the size of the control region). The PHICH is a response channel to UL transmission and carries a HARQ ACK/NACK signal. Control information transmitted on the PDCCH is referred to as downlink control information (DCI). The DCI includes UL resource allocation information, DL resource allocation information, or a UL Tx power control command for an arbitrary UE group.

The PDCCH may carry resource allocation and transmission format information of a downlink shared channel (DL-SCH) (also referred to as DL grant), resource allocation information of an UL-SCH (also referred to as UL grant), paging information on a paging channel (PCH), system information on the DL-SCH, resource allocation information of an upper layer control message such as a random access response transmitted on the PDSCH, a set of Tx power control commands for individual UEs in an arbitrary UE group, activation information of Voice over IP (VoIP), etc.

A BS determines a PDCCH format (or DCI format) according to DCI to be transmitted to a UE and attaches CRC to control information. The CRC is masked with a unique identifier (radio network temporary identifier (RNTI)) according to an owner or use of the PDCCH.

Figure 21:
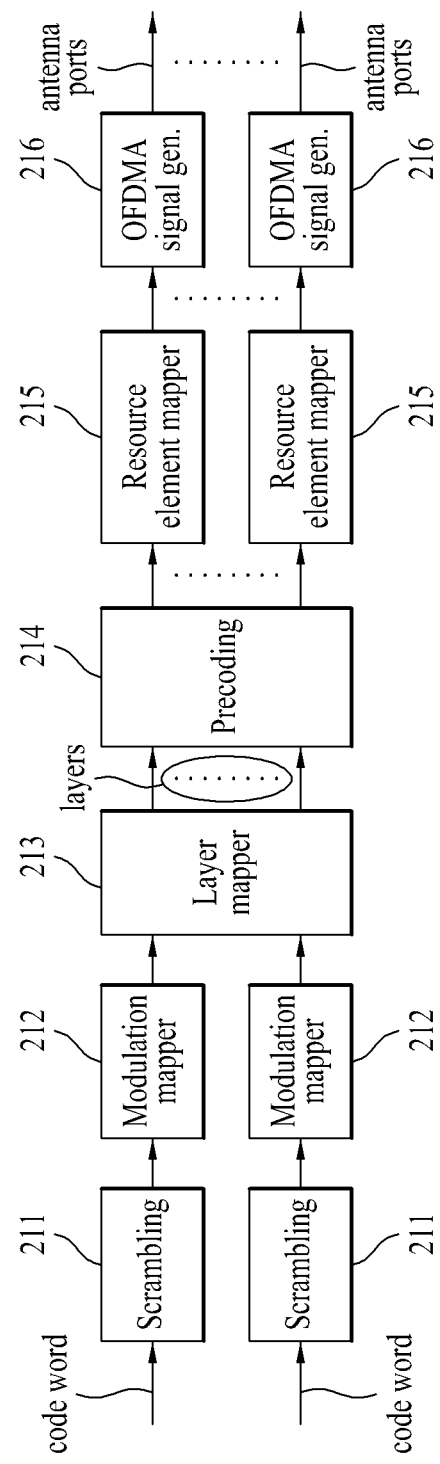
FIG. 21 is a diagram for describing a signal processing operation of a BS to transmit a DL signal.

FIG. 21 is a diagram for describing a signal processing operation of a BS to transmit a DL signal.

In a 3GPP LTE system, a BS may transmit one or more codewords in downlink. Each codeword may be processed into complex symbols through a scrambling module 211 and a modulation mapper 212 as in the UL transmission of FIG. 5. In this case, when only control information is transmitted on a PDSCH in D2D communication, modulation may be performed using QPSK only. After that, the complex symbols are mapped to a plurality of layers by a layer mapper 213, and each layer may be multiplied by a precoding matrix by a precoding module 214 and allocated to Tx antennas. The transmission signal for each antenna processed as described above may be mapped to time-frequency REs by an RE mapper 215 and then transmitted through an OFDMA signal generator 216 via the antenna.

4. Outline of Device to which the Present Invention is Applicable

Figure 22:
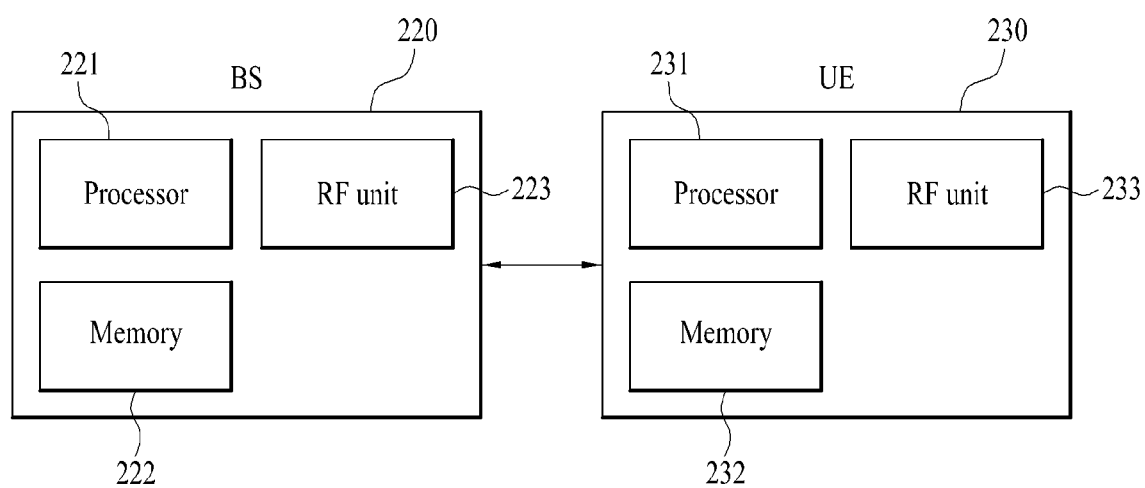
FIG. 22 is a block diagram illustrating a wireless access system according to an embodiment of the present invention.

FIG. 22 is a block diagram illustrating a wireless access system according to an embodiment of the present invention.

Referring to FIG. 22, the wireless communication system includes a BS 220 and a plurality of D2D devices 230 located in coverage of the BS 220. FIG. 22 illustrates a case that communication is performed between the BS 220 and the D2D device 230. However, the D2D communication method according to the present invention is also applicable between the D2D devices 230. In addition, as described above, a relay device may be a BS as well as a D2D device.

The BS 220 includes a processor 221, a memory 222, and a radio frequency (RF) unit 223. The processor 221 implements the functions, procedures, and/or methods proposed by the present invention. Layers of a radio interface protocol may be implemented by the processor 221. The memory 222 is connected to the processor 221 and stores various types of information for operating the processor 221. The RF unit 223 is connected to the processor 221 and transmits and/or receives wireless signals.

The D2D device 230 includes a processor 231, a memory 232, and an RF unit 233. The processor 231 implements the functions, procedures, and/or methods proposed by the present invention. Layers of a radio interface protocol may be implemented by the processor 231. The memory 232 is connected to the processor 231 and stores various types of information for operating the processor 231. The RF unit 233 is connected to the processor 231 and transmits and/or receives wireless signals.

The memory 222 or 232 may be located inside or outside the processor 221 or 231 and connected to the processor 221 or 231 through various well-known means. In addition, the BS 220 and/or the D2D devices 230 may have a single antenna or multiple antennas.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The embodiments of the present invention are applicable to various wireless access systems. Examples of the wireless access systems include 3rd Generation Partnership Project (3GPP), 3GPP2, and/or Institute of Electrical and Electronics Engineers (IEEE) 802 system, etc. The embodiments of the present invention may be applied to a variety of wireless access systems and all technical fields using the wireless access systems.

The invention claimed is:

1. A device-to-device (D2D) data transmission method in a wireless access system supporting D2D communication and cellular communication, the method performed by a first device which performs D2D communication with a second device, and comprising:
    transmitting first data to the second device using only a physical channel used for uplink (UL) data transmission in the cellular communication, wherein the first data is multiplexed with a control signal;
    receiving second data from the second device using only the physical channel, and
    receiving, from the second device, offset value information required to calculate a number of resource elements allocated to the control signal.

2. The D2D data transmission method of claim 1, wherein the physical channel is a physical uplink shared channel (PUSCH).

3. The D2D data transmission method of claim 1, further comprising: transmitting only the control signal to the second device using quadrature phase shift keying (QPSK) modulation scheme.

4. The D2D data transmission method of claim 1, wherein the offset value information received from the second device is an offset value required to calculate the number of resource elements allocated to the control signal.

5. The D2D data transmission method of claim 1, further comprising: calculating, by the first device, an offset value required to calculate the number of resource elements allocated to the control signal, based on the offset value information received from the second device, wherein the offset value information is acknowledgement (ACK)/negative-ACK (NACK) information.

6. A device-to-device (D2D) data transmission method in a wireless access system supporting D2D communication and cellular communication, the method performed by a first device which performs D2D communication with a second device, and comprising:
    transmitting first data to the second device using only a physical channel used for downlink (DL) data transmission in the cellular communication, wherein the first data is multiplexed with a control signal; and
    receiving second data from the second device using only the physical channel, and
    receiving, from the second device, offset value information required to calculate a number of resource elements allocated to the control signal.

7. The D2D data transmission method of claim 6, wherein the physical channel is a physical downlink shared channel (PDSCH).

8. A device for performing device-to-device (D2D) communication in a wireless access system supporting D2D communication and cellular communication, the device comprising:
    a radio frequency (RF) unit for transmitting and receiving wireless signals; and
    a processor for performing D2D communication with a second device, wherein the processor:
        transmits first data to the second device through the RF unit using only a physical channel used for uplink (UL) data transmission in the cellular communication, wherein the first data is multiplexed with a control signal;

receives second data from the second device through the RF unit using only the physical channel, and receives, from the second device, offset value information required to calculate a number of resource elements allocated to the control signal.

9. The device of claim 8, wherein the physical channel is a physical uplink shared channel (PUSCH).

10. The device of claim 8, wherein the processor transmits only the control signal to the second device through the RF unit using quadrature phase shift keying (QPSK) modulation scheme.

11. The device of claim 8, wherein the the offset value information received from the second device is an offset value required to calculate the number of resource elements allocated to the control signal.

12. The device of claim 8, wherein the processor calculates an offset value required to calculate the number of resource elements allocated to the control signal, based on the offset value information received from the second device, wherein the offset value information is acknowledgement (ACK)/negative-ACK (NACK) information.

13. A device for performing device-to-device (D2D) communication in a wireless access system supporting D2D communication and cellular communication, the device comprising:

a radio frequency (RF) unit for transmitting and receiving wireless signals; and a processor for performing D2D communication with a second device, wherein the processor:

transmits first data to the second device through the RF unit using only a physical channel used for downlink (DL) data transmission in the cellular communication, wherein the first data is multiplexed with a control signal;

receives second data from the second device through the RF unit using only the physical channel, and receives, from the second device, offset value information required to calculate a number of resource elements allocated to the control signal.

14. The device of claim 13, wherein the physical channel is a physical downlink shared channel (PDSCH).

* * * * *